(12) United States Patent
Akuzawa

(10) Patent No.: US 10,126,748 B2
(45) Date of Patent: Nov. 13, 2018

(54) VESSEL DISPLAY SYSTEM AND SMALL VESSEL INCLUDING THE SAME

(71) Applicant: YAMAHA HATSUDOKI KABUSHIKI KAISHA, Iwata-shi, Shizuoka (JP)

(72) Inventor: Shu Akuzawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 685 days.

(21) Appl. No.: 14/490,702

(22) Filed: Sep. 19, 2014

(65) Prior Publication Data

US 2015/0089427 A1 Mar. 26, 2015

(30) Foreign Application Priority Data

Sep. 26, 2013 (JP) .................................. 2013-200200

(51) Int. Cl.
*G05D 1/02* (2006.01)
*B63H 20/12* (2006.01)
*B63H 20/20* (2006.01)
*B63H 20/00* (2006.01)

(52) U.S. Cl.
CPC ........... *G05D 1/0206* (2013.01); *B63H 20/12* (2013.01); *B63H 20/20* (2013.01); *B63H 2020/003* (2013.01)

(58) Field of Classification Search
CPC ............................ G06F 3/0482; G05D 1/0206
See application file for complete search history.

(56) References Cited

U.S. PATENT DOCUMENTS

| 3,754,247 | A | * | 8/1973 | Hansford | .................. | G01S 1/02 340/958 |
| 5,592,382 | A | * | 1/1997 | Colley | ................. | G01C 23/005 340/990 |
| 6,542,796 | B1 | * | 4/2003 | Gibbs | .................. | G01C 23/005 244/183 |
| 6,611,737 | B1 | * | 8/2003 | El-Tahan | ............. | G05D 1/0206 701/21 |
| 6,707,414 | B2 | * | 3/2004 | Van Rees | .................. | G01S 7/04 342/23 |

(Continued)

FOREIGN PATENT DOCUMENTS

EP 0 071 333 A1 2/1983

*Primary Examiner* — Amy Ng
*Assistant Examiner* — Meseker Takele
(74) *Attorney, Agent, or Firm* — Keating and Bennett, LLP

(57) ABSTRACT

A vessel display system includes a display device, an autopilot screen display unit displaying on the display device an autopilot screen for an autopilot mode, an automatic berthing control screen display unit displaying on the display device an automatic berthing control screen for an automatic berthing mode of automatically controlling a propulsion device and a steering mechanism to make the vessel berth at a berthing target position, a destination approach condition judging unit judging whether or not a predetermined destination approach condition, indicating that the vessel has come close to the destination, is satisfied, and a screen transition control unit automatically making the display on the display device transition from the autopilot screen to the automatic berthing control screen when the destination approach condition judging unit judges that the destination approach condition is satisfied.

9 Claims, 10 Drawing Sheets

(56) References Cited

U.S. PATENT DOCUMENTS

| | | | |
|---|---|---|---|
| 6,774,773 B2* | 8/2004 | Funayose | B63B 49/00 340/438 |
| 6,994,046 B2* | 2/2006 | Kaji | B63H 25/42 114/144 R |
| 8,098,175 B2* | 1/2012 | Berthou | B64D 43/00 340/945 |
| 8,622,778 B2* | 1/2014 | Tyers | B63H 21/21 114/144 B |
| 2003/0092328 A1* | 5/2003 | Funayose | B63B 49/00 440/2 |
| 2004/0210847 A1* | 10/2004 | Berson | G01D 7/08 715/788 |
| 2006/0164260 A1* | 7/2006 | Berthou | B64D 43/00 340/945 |
| 2007/0073454 A1* | 3/2007 | Kaji | G05D 1/0206 701/21 |
| 2007/0244639 A1* | 10/2007 | Butterworth | G05D 1/0206 701/431 |
| 2011/0175930 A1* | 7/2011 | Hwang | G06F 3/0481 345/629 |
| 2012/0072059 A1* | 3/2012 | Glaeser | B63B 43/18 701/21 |
| 2012/0159386 A1* | 6/2012 | Kang | G06F 3/0481 715/800 |
| 2013/0110329 A1 | 5/2013 | Kinoshita et al. | |
| 2014/0089833 A1* | 3/2014 | Hwang | G06F 3/04817 715/769 |
| 2015/0033176 A1* | 1/2015 | Miichi | G09B 29/007 715/771 |

\* cited by examiner

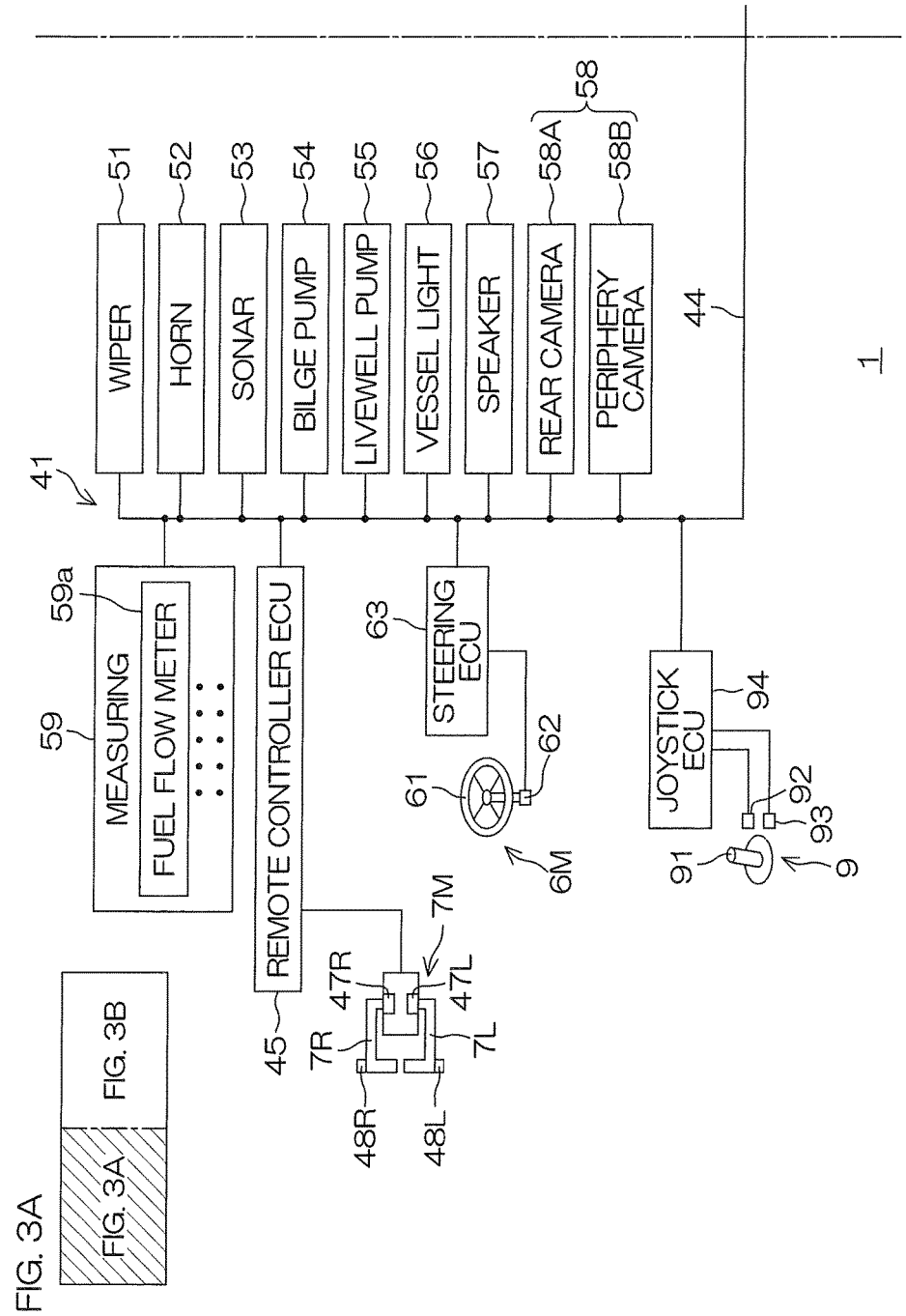

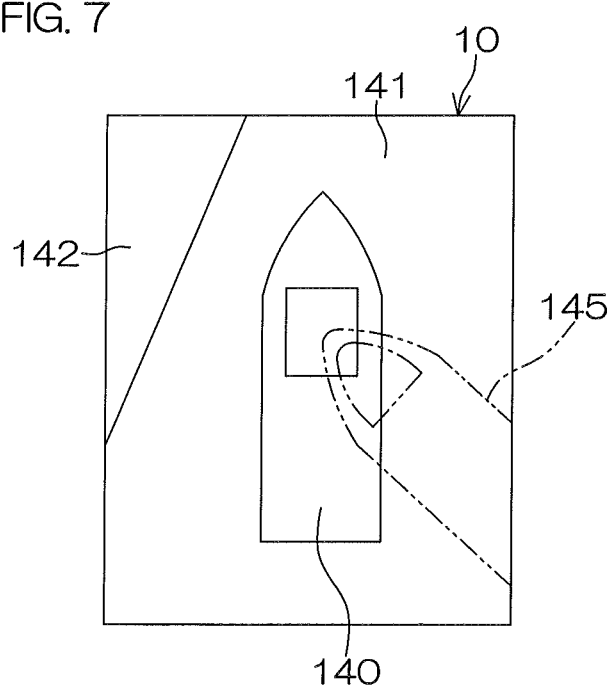

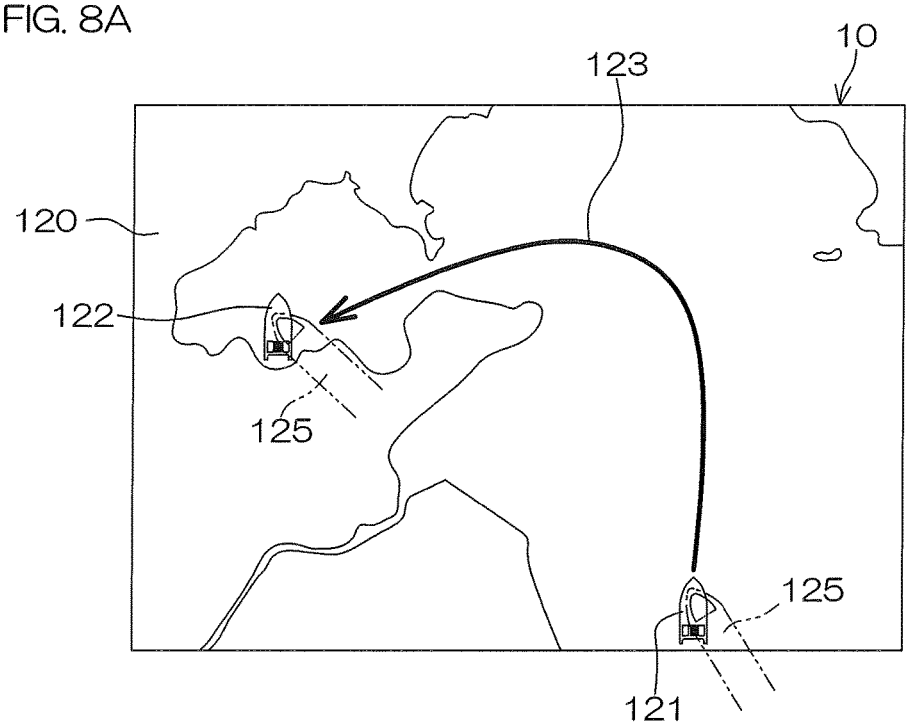
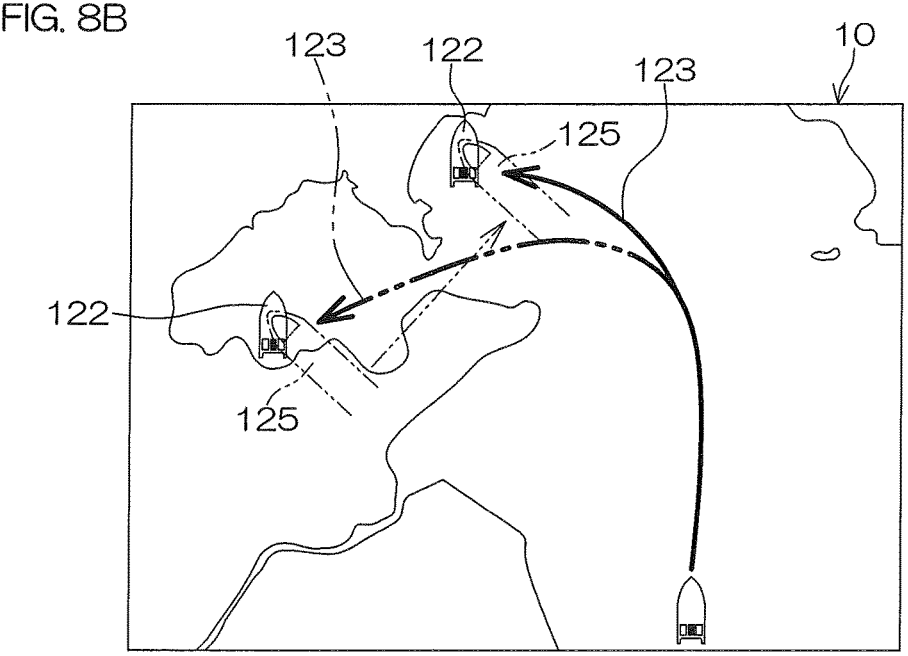

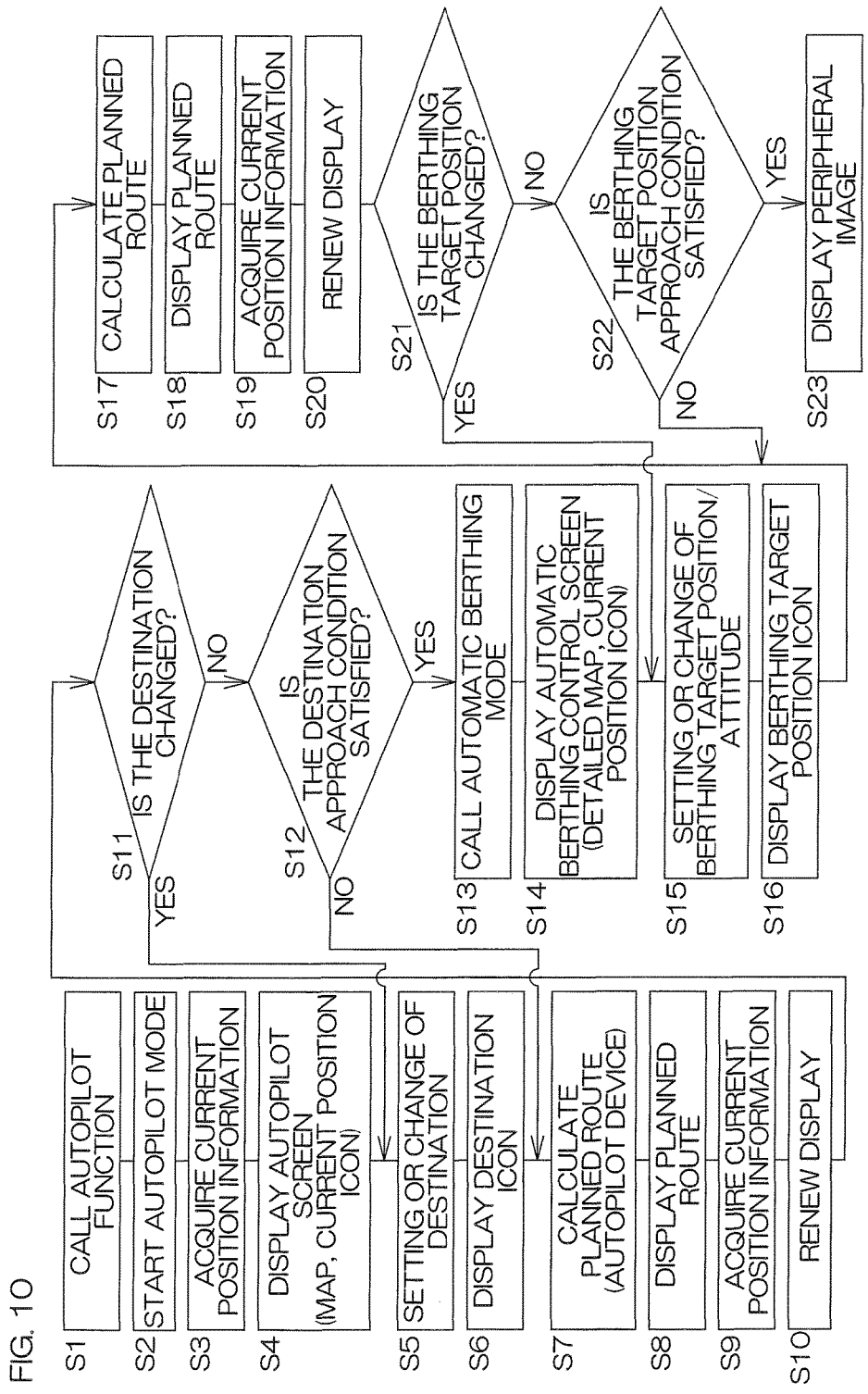

VESSEL DISPLAY SYSTEM AND SMALL VESSEL INCLUDING THE SAME

BACKGROUND OF THE INVENTION

1. Field of the Invention

The present invention relates to a vessel display system and a small vessel including the same. A small vessel refers to a vessel with a gross tonnage of less than 20 tons. However, a vessel with a gross tonnage of not less than 20 tons is considered to be a small vessel if its length is less than 20 meters.

2. Description of the Related Art

US 2013/0110329 A1 discloses the size reduction of an operating device of a small vessel by an arrangement in which a software key used to operate the movement of the small vessel is displayed in a display device having a touch panel function.

EP 0071333 A1 discloses an autopilot with which a route is set between an origin and a destination based on data indicating an absolute position of the destination and automatic navigation of a large vessel is performed in accordance with the set route. The data indicating the absolute position are, specifically, a combination of the longitude and the latitude of the destination.

SUMMARY OF THE INVENTION

The inventor of preferred embodiments of the present invention described and claimed in the present application conducted an extensive study and research regarding vessel display systems, such as the one described above, and in doing so, discovered and first recognized new unique challenges and previously unrecognized possibilities for improvements as described in greater detail below.

The software key disclosed in US 2013/0110329 A1 is a key that is operated when making a vessel move laterally or making the vessel turn on the spot. It is therefore convenient for vessel maneuvering when the vessel is approaching a berthing target position, such as near a pier. However, in moving away from the berthing target position, operation using a conventionally used steering wheel and throttle lever is more suitable.

On the other hand, EP 0071333 A1 is convenient in that a destination can be arrived at by automatic vessel maneuvering. However, especially in the case of small vessels, a berthing location at a marina is not fixed in many cases. When a vessel operator arrives at a marina of a destination, the operator finds an available space within the marina and the vessel is berthed at the available space. Therefore, the autopilot of EP 0071333 A1, although applicable to a large vessel, is not a function that can be applied as it is to a small vessel. Specifically, the autopilot can be used when the distance to the destination is long. However, when the destination becomes close, the autopilot must be interrupted and the vessel must be moved to the berthing location by manual vessel maneuvering. To use the autopilot near the destination, the longitude and the latitude of the berthing target position must be input again.

The inventor of the preferred embodiments of the present application has been researching vessel display systems in which a plurality of screens are displayed on a display device in a switching or alternating manner. When an autopilot function is to be used, it is appropriate for an autopilot screen to be displayed on the display device. The autopilot screen preferably is a screen in which a current position of a small vessel, a destination, and a planned route are displayed on a map. The planned route is a route that is planned for arriving at the destination from the current position. The autopilot determines a course of the vessel to be in accordance with the planned route.

As mentioned above, after arriving near the destination using the autopilot, the berthing target position must be reset to guide the vessel to the berthing location by automatic vessel maneuvering. In this process, it is appropriate to change the scale of the map displayed in the autopilot screen to cause a detailed map to be displayed and then input information on the berthing target position. Otherwise, the current position and the berthing target position will be displayed at close positions on the map displayed in the autopilot screen, making it difficult to check the planned route from the current position to the berthing target position and check the berthing target position.

There preferably is a case in which the destination information set in the autopilot is used as it is as the berthing target position information. Even in this case, if the current position and the destination (berthing target position) are displayed closely, it will be difficult to check the planned route and the berthing target position and such a display thus does not provide useful information to a user.

The inventor of the preferred embodiments of the present application has thus noticed that when using an autopilot function, a circumstance may arise in which the providing of information that is useful to a user is difficult and thus the inventor developed various preferred embodiments of the present invention.

A preferred embodiment of the present invention provides a vessel display system capable of providing information that is useful to a user when using an autopilot function and a small vessel including such a vessel display system.

A preferred embodiment of the present invention provides a vessel display system including a display device, an autopilot screen display unit that is configured to display, on the display device, an autopilot screen for an autopilot mode of automatically controlling a course of a vessel so as to guide the vessel to a destination, an automatic berthing control screen display unit that is configured to display, on the display device, an automatic berthing control screen for an automatic berthing mode of automatically controlling a propulsion device and a steering mechanism so as to make the vessel be berthed at a berthing target position, a destination approach condition judging unit that is configured to judge whether or not a predetermined destination approach condition, indicating that the vessel has come close to the destination, is satisfied, and a screen transition control unit that is configured or programmed to automatically make the display on the display device transition from the autopilot screen to the automatic berthing control screen when the destination approach condition judging unit judges that the destination approach condition is satisfied.

With this arrangement, when the course of the vessel is being automatically controlled in the autopilot mode, the autopilot screen is displayed on the display device. When the vessel approaches the destination and the predetermined destination approach condition is satisfied, the display on the display device transitions automatically from the autopilot screen to the automatic berthing control screen. The automatic berthing control screen is a screen for the automatic berthing mode and in the automatic berthing mode, the propulsion device and the steering mechanism are automatically controlled to berth the vessel at the berthing target position.

The display on the display device thus transitions automatically from the autopilot screen to the automatic berthing control screen based on the destination approach condition, and useful screen displays are thus provided in accordance with the circumstances. The autopilot mode and the automatic berthing mode are thus able to be used more readily.

The transition of the control mode (control mode of a vessel running controlling apparatus) from the autopilot mode to the automatic berthing mode may be performed automatically or manually. That is, the display on the display device may transition automatically together with the automatic transition of the control mode. Alternatively, the screen display on the display preferably transitions automatically when the destination approach condition is satisfied, and the user preferably is thus urged to change the control mode to the automatic berthing mode by manual operation.

In a preferred embodiment of the present invention, the vessel display system further includes a peripheral image display unit that is configured to display, on the display device, a peripheral image that is an actual image of the periphery of the vessel and a berthing target position approach condition judging unit that is configured to judge whether or not a predetermined berthing target position approach condition, indicating that the vessel has come close to the berthing target position, is satisfied. When the berthing target position approach condition judging unit judges that the berthing target position approach condition is satisfied, the screen transition control unit makes the display on the display device transition automatically from the automatic berthing control screen to the peripheral image.

With this arrangement, when the propulsion device and the steering mechanism are automatically controlled in the automatic berthing mode, the automatic berthing control screen is displayed on the display device. When the vessel approaches the berthing target position and the predetermined berthing target position approach condition is satisfied, the display on the display device transitions automatically from the automatic berthing control screen to the peripheral image. The peripheral image is the actual image of the periphery of the vessel. The user is thus able to perform vessel maneuvering while checking the actual circumstances of the periphery of the vessel on the display device.

The display on the display device thus transitions automatically from the automatic berthing control screen to the peripheral image based on the berthing target position approach condition, and useful screen displays are thus provided in accordance with the circumstances.

In a preferred embodiment of the present invention, the vessel display system further includes a current position acquisition unit that is configured to acquire the current position of the vessel and the autopilot screen includes map information including the current position of the vessel acquired by the current position acquisition unit. With this arrangement, the autopilot screen includes the map information that includes the current position of the vessel and the user is thus able to ascertain the current position of the vessel visually.

Preferably, the autopilot screen further includes a display of the destination of the vessel. The circumstances in which the vessel is running toward the destination are thus able to be ascertained visually.

Preferably, the autopilot screen further includes a display of the planned route from the current position to the destination. The planned route to the destination is thus able to be ascertained visually.

In a preferred embodiment of the present invention, the automatic berthing control screen includes the current position of the vessel acquired by the current position acquisition unit and includes map information that is more detailed than the map information included in the autopilot screen. With this arrangement, the current position is displayed together with the detailed map information in the automatic berthing control screen. The current position and the berthing target position are thus sufficiently separated on the detailed map. The user is thus able to ascertain the relationship between the current position and the berthing target position easily and more useful information is thus provided to the user.

Preferably, the automatic berthing control screen further includes a display of the berthing target position. The user is thus able to ascertain the relationship between the current position and the berthing target position more easily and to visually ascertain the circumstances in which the vessel is running toward the berthing target position. The automatic berthing control screen includes the detailed map, the current position and the berthing target position are displayed on the detailed map, and these positions are spaced at a sufficient distance on the detailed map. The relationship between the current position and the berthing target position is thus displayed clearly.

Preferably, the automatic berthing control screen further includes the planned route from the current position to the berthing target position. The planned route to the berthing target position is thus able to ascertained visually.

In a preferred embodiment of the present invention, the destination approach condition includes that the distance between the current position of the vessel and the destination is not more than a predetermined distance. With this arrangement, when the distance from the current position of the vessel to the destination becomes not more than the predetermined distance, the destination approach condition is satisfied and the display on the display device transitions automatically from the autopilot screen to the automatic berthing control screen. Appropriate screen transition is thus made possible and useful information is thus provided to the user at an appropriate timing.

In a preferred embodiment of the present invention, the destination approach condition includes that the current position of the vessel is within a predetermined area that includes the destination. With this arrangement, when the vessel enters the predetermined area that includes the destination, the destination approach condition is satisfied and the display on the display device transitions automatically from the autopilot screen to the automatic berthing control screen. Appropriate screen transition is thus made possible and useful information is thus provided to the user at an appropriate timing.

The predetermined area preferably is an area set within a harbor of the destination or preferably is an area that includes the harbor of the destination and a region in its vicinity. For example, automatic transition from the autopilot screen to the automatic berthing control screen preferably is performed at the point of arrival at an entrance of the harbor of the destination.

In a preferred embodiment of the present invention, the vessel display system further includes a touch panel arranged on a display surface of the display device and the autopilot screen includes a destination icon indicating the destination. The vessel display system further includes a destination change accepting unit configured to accept an operation of changing the destination by moving the destination icon on the display surface of the display device by operating the touch panel when the autopilot screen is displayed on the display device.

With this arrangement, the autopilot screen includes the destination icon and, by an operation of moving the destination icon on the screen (so-called drag operation), an input corresponding to the movement is provided to the touch panel. The destination is changed accordingly. That is, the destination can be changed simply by performing the operation of moving the destination icon on the screen. There is thus no need to perform input of coordinates of the destination and the use of the autopilot function is thus made easy.

The setting of a new destination preferably is performed by a drag operation of moving a current position icon, indicating the current position of the vessel, to the position of the destination on the map. In this case, the planned route of the vessel preferably is calculated automatically based on the route of movement (dragging route) of the current position icon. Also, the setting of the new destination preferably is performed by positioning the destination icon, provided apart from the current position icon, on the destination on the map. In this case, the positioning of the destination icon preferably is performed by dragging on the map from the current position icon or the destination icon preferably is positioned by touching the destination on the map. In the case of dragging on the map, the route of the vessel preferably is planned by automatic calculation based on the route of movement (dragging route) of the destination icon.

In a preferred embodiment of the present invention, the automatic berthing control screen includes a berthing target position icon indicating the berthing target position, and the vessel display system further includes a berthing target position change accepting unit that is configured to accept an operation of changing the berthing target position by moving the berthing target position icon on the display surface of the display device by operating the touch panel when the automatic berthing control screen is displayed on the display device.

With this arrangement, the automatic berthing control screen includes the berthing target position icon and, by an operation of moving the berthing target position icon on the screen (so-called drag operation), an input corresponding to the movement is provided to the touch panel. The berthing target position is changed accordingly. That is, the berthing target position preferably is changed simply by performing the operation of moving the berthing target position icon on the screen. There is thus no need to input the coordinates of the berthing target position.

The setting of the new berthing target position preferably is performed by a drag operation of moving a current position icon, indicating the current position of the vessel, to the berthing target position on the map. In this case, the planned route of the vessel preferably is calculated automatically based on the route of movement (dragging route) of the current position icon. Also, the setting of the new berthing target position preferably is performed by positioning the berthing target position icon, provided apart from the current position icon, on the berthing target position on the map. In this case, the positioning of the berthing target position icon preferably is performed by dragging on the map from the current position icon or the berthing target position icon preferably is positioned by touching the berthing target position on the map. In the case of dragging on the map, the route of movement of the vessel preferably is planned by automatic calculation based on the route of movement (dragging route) of the berthing target position icon.

When the destination approach condition is satisfied, the display on the display device is automatically switched from the autopilot screen to the automatic berthing control screen, and the user thus is able to set the berthing target position without having to perform an operation for changing the screen.

In a preferred embodiment of the present invention, the berthing target position change accepting unit is configured to accept an operation of changing a berthing attitude of the vessel at the berthing target position by changing a direction of the berthing target position icon on the display surface of the display device by operating the touch panel when the automatic berthing control screen is displayed on the display device. With this arrangement, a change in the vessel attitude at the berthing target position is capable of being commanded by changing the direction of the berthing target position icon displayed in the automatic berthing control screen. A vessel maneuvering interface that is easy to use is thus provided.

A preferred embodiment of the present invention provides a small vessel including a hull, the propulsion device mounted on the hull, the steering mechanism mounted on the hull, a vessel display system having the features described above, and a vessel running controlling apparatus, which includes the autopilot mode and the automatic berthing mode in control modes of controlling the propulsion device and the steering mechanism and is configured such that the control mode automatically transitions from the autopilot mode to the automatic berthing mode when the destination approach condition is satisfied.

With this arrangement, the control mode of the vessel running controlling apparatus automatically transitions from the autopilot mode to the automatic berthing mode when the destination approach condition is satisfied. Accordingly, the display on the display device automatically transitions from the autopilot screen to the automatic berthing control screen. The control mode and the screen display are thus switched automatically in accordance with the circumstances of approaching the destination and appropriate information in accordance with the circumstances is thus displayed on the display. The autopilot mode and the automatic berthing mode are thus easy to use and a small vessel that is easy to maneuver is thus provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 3A and 3B show a block diagram for describing an electrical arrangement of the small vessel.

FIG. 7 shows an example of a peripheral image synthesized based on images taken by a periphery camera.

FIG. 8A and FIG. 8B are diagrams for respectively describing a setting of a destination and a changing of the destination using the autopilot screen.

FIG. 10 is a flowchart for describing an operation example of the central controller.

DETAILED DESCRIPTION OF THE PREFERRED EMBODIMENTS

Figure 1:
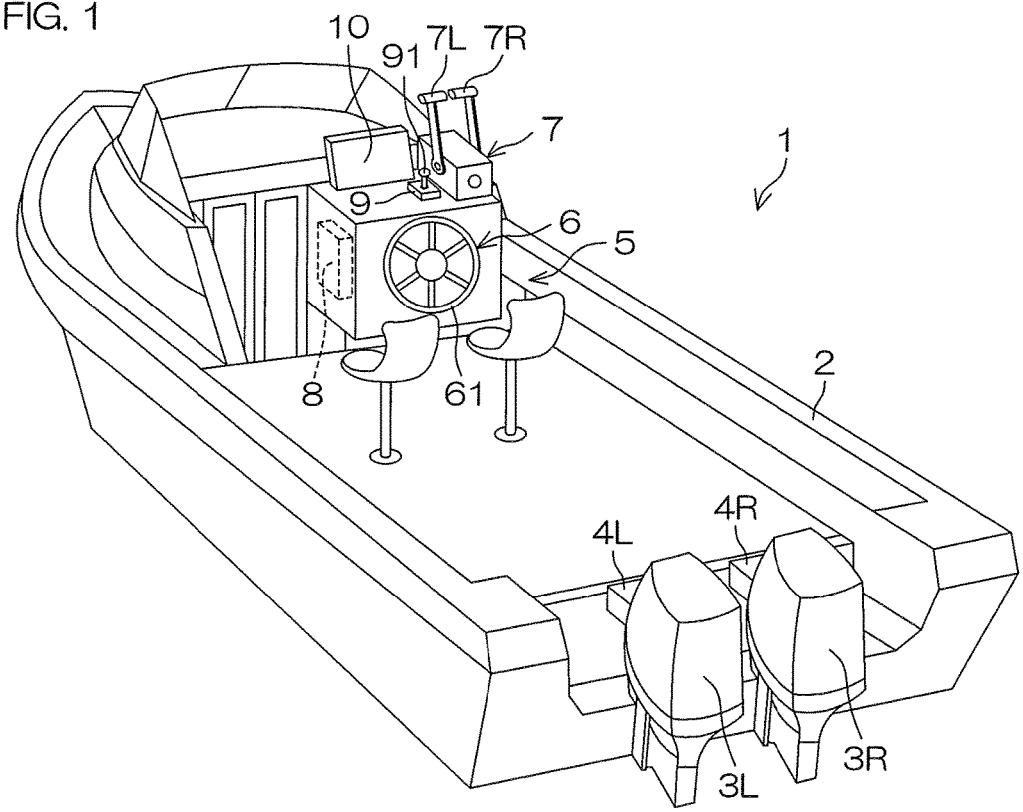
FIG. 1 is a perspective view of a small vessel according to a preferred embodiment of the present invention.

FIG. 1 is a perspective view of a small vessel 1 according to a preferred embodiment of the present invention. The small vessel 1 includes a hull 2, a plurality (preferably two in the present preferred embodiment, for example) of outboard motors 3L and 3R, and a plurality of steering mechanisms 4L and 4R.

The outboard motors 3L and 3R are an example of propulsion devices that apply propulsive forces to the hull 2. The plurality of outboard motors 3L and 3R are mounted so as to be aligned in a width direction of the hull 2. The plurality of outboard motors 3L and 3R are mounted on a stern of the hull 2 so as to be respectively steerable in left and right directions. The plurality of steering mechanisms 4L and 4R steer the plurality of outboard motors 3L and 3R respectively to the left and right. Hereinafter, the plurality of outboard motors 3L and 3R shall be referred to as "outboard motors 3" when referred to collectively. Also, the plurality of steering mechanisms 4L and 4R shall be referred to as "steering mechanisms 4" when referred to collectively.

The hull 2 includes a vessel operator compartment 5. The vessel operator compartment 5 includes a steering apparatus 6, a remote controller 7, a central controller 8, a joystick device 9, and a display device 10.

The steering apparatus 6 is an apparatus by which a vessel operator sets the course of the small vessel 1. Specifically, the steering apparatus 6 includes a steering wheel 61 that is rotated to the left and right by the vessel operator. The outboard motors 3 are steered by rotating the steering wheel 61 and the small vessel 1 is thus made to turn to the left and right.

The remote controller 7 includes levers 7L and 7R that are operated by the vessel operator. By operation of the levers 7L and 7R, the outputs of the outboard motors 3L and 3R are adjusted respectively and the vessel speed is thus adjusted. Also, by operation of the levers 7L and 7R, the directions of the propulsive forces generated by the outboard motors 3L and 3R are capable of being switched between a forward drive direction and reverse drive direction.

The joystick device 9 includes a stick 91 that is operated by the vessel operator. The stick 91 is operable at an incline relatively to the front, rear, right, and left and is also capable of being rotatingly operated around its axis. A course command in an inclination direction of the stick 91 is thus generated and a turning command in accordance with a rotation direction and a rotation amount of the stick 91 is generated.

The display device 10 is arranged at a location that is easily viewable by the vessel operator operating the vessel at the vessel operator compartment 5, that is, in front of the vessel operator. The display device 10 displays information on the small vessel 1.

The central controller 8 is configured or programmed to communicate with the outboard motors 3, the steering apparatus 6, the remote controller 7, and the display device 10 to perform integrated control of these components.

Figure 2:
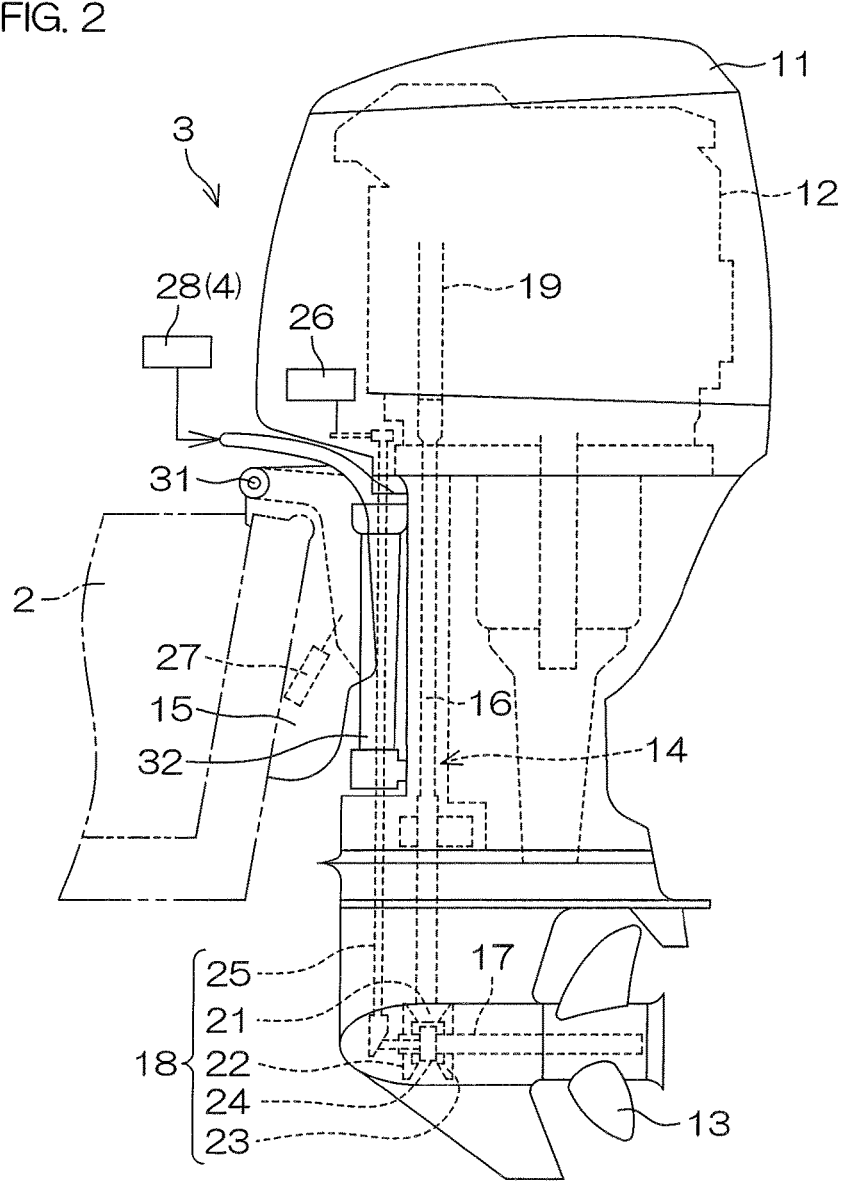
FIG. 2 is a schematic side view for describing an arrangement of an outboard motor included in the small vessel.

FIG. 2 is a schematic side view for describing the arrangement of the outboard motor 3. The outboard motor 3 includes a cover member 11, an engine 12, a propeller 13, a power transmitting mechanism 14, and a bracket 15. The cover member 11 houses the engine 12 and the power transmitting mechanism 14. The engine 12 is arranged in an upper space inside the cover member 11. The engine 12 is an example of a power source that generates the propulsive force. The propeller 13 is driven to rotate by the driving force generated by the engine 12. The propeller 13 is arranged outside the cover member 11 at a lower portion of the outboard motor 3. The power transmitting mechanism 14 transmits the driving force of the engine 12 to the propeller 13. The power transmitting mechanism 14 includes a driveshaft 16, a propeller shaft 17, and a shift mechanism 18.

The driveshaft 16 is arranged to extend along an up/down direction. The driveshaft 16 is coupled to a crankshaft 19 of the engine 12 and transmits the power generated by the engine 12. The propeller shaft 17 is arranged to extend along a front/rear direction. The propeller shaft 17 is coupled via the shift mechanism 18 to a lower portion of the driveshaft 16. The propeller shaft 17 transmits the driving force of the driveshaft 16 to the propeller 13.

The shift mechanism 18 changes the rotation direction of the power transmitted from the driveshaft 16 to the propeller shaft 17. The shift mechanism 18 includes a pinion gear 21, a forward drive gear 22, a reverse drive gear 23, and a dog clutch 24. The pinion gear 21 is fixed to a lower end of the driveshaft 16. The forward drive gear 22 and the reverse drive gear 23 are arranged on the propeller shaft 17 and are configured so as to be rotatable relative to the propeller shaft 17. The pinion gear 21 is engaged with the forward drive gear 22 and the reverse drive gear 23. The dog clutch 24 is splined to the propeller shaft 17 and is arranged between the forward drive gear 22 and the reverse drive gear 23. The dog clutch 24 is movable along the propeller shaft 17 and rotates together with the propeller shaft 17. The dog clutch 24 is movable to a forward drive position, a neutral position, and a reverse drive position on the propeller shaft 17. The forward drive position is a position at which the dog clutch 24 engages with the forward drive gear 22 and does not engage with the reverse drive gear 23. The reverse drive position is a position at which the dog clutch 24 engages with the reverse drive gear 23 and does not engage with the forward drive gear 24. The neutral position is a position at which the dog clutch 24 engages with neither the forward drive gear 22 nor the reverse drive gear 23 and is a position between the forward drive position and the reverse drive position. When the dog clutch 24 is positioned at the forward drive position, the rotation of the driveshaft 16 is transmitted to the propeller shaft 17 via the forward drive gear 22. The propeller 13 is thus made to rotate in the direction of generating a propulsive force that drives the hull 2 forward. When the dog clutch 24 is positioned at the reverse drive position, the rotation of the driveshaft 16 is transmitted to the propeller shaft 17 via the reverse drive gear 23. The propeller 13 is thus made to rotate in the direction of generating a propulsive force that drives the hull 2 in reverse. When the dog clutch 24 is positioned at the neutral position, the rotation of neither the forward drive gear 22 nor the reverse drive gear 23 is transmitted to the propeller shaft 17. Therefore, a driving force is not transmitted to the propeller 13.

The shift mechanism 18 further includes a shift rod 25 arranged to move the dog clutch 24 along the propeller shaft 17. The shift rod 25 is driven by a shift actuator 26. Therefore, the dog clutch 24 preferably is controlled to be at any of the forward drive position, the neutral position, and the reverse drive position by controlling the operation of the shift actuator 26. The position of the dog clutch 24 may at times be referred to hereinafter as the "shift position."

The bracket 15 is a mechanism configured to mount the outboard motor 3 on the hull 2. The outboard motor 3 is mounted so as to be turnable around a tilt shaft 31 and a steering shaft 32 with respect to the bracket 15. The tilt shaft 31 extends in a width direction (horizontal direction) of the hull 2. The steering shaft 32 is perpendicular or substantially perpendicular to the tilt shaft 31 and extends along or substantially along the up/down direction in the usage state of the outboard motor 3. A tilt/trim actuator 27 that turns the outboard motor 3 around the tilt shaft 31 is included. By turning the outboard motor 3 around the tilt shaft 31, a trim angle of the outboard motor 3 preferably is changed. The trim angle corresponds to the angle of mounting of the outboard motor 3 with respect to the hull 2.

The steering mechanism 4 is arranged to turn the outboard motor 3 around the steering shaft 32. The steering mechanism 4 includes a steering actuator 28 as a power source. A steering angle preferably is changed by turning the outboard motor 3 around the steering shaft 32 via the steering mechanism 4. The steering angle is an angle that the direction of the propulsive force of the outboard motor 3 defines with respect to a central line extending in the front/rear direction of the hull 2.

Figure 3B:
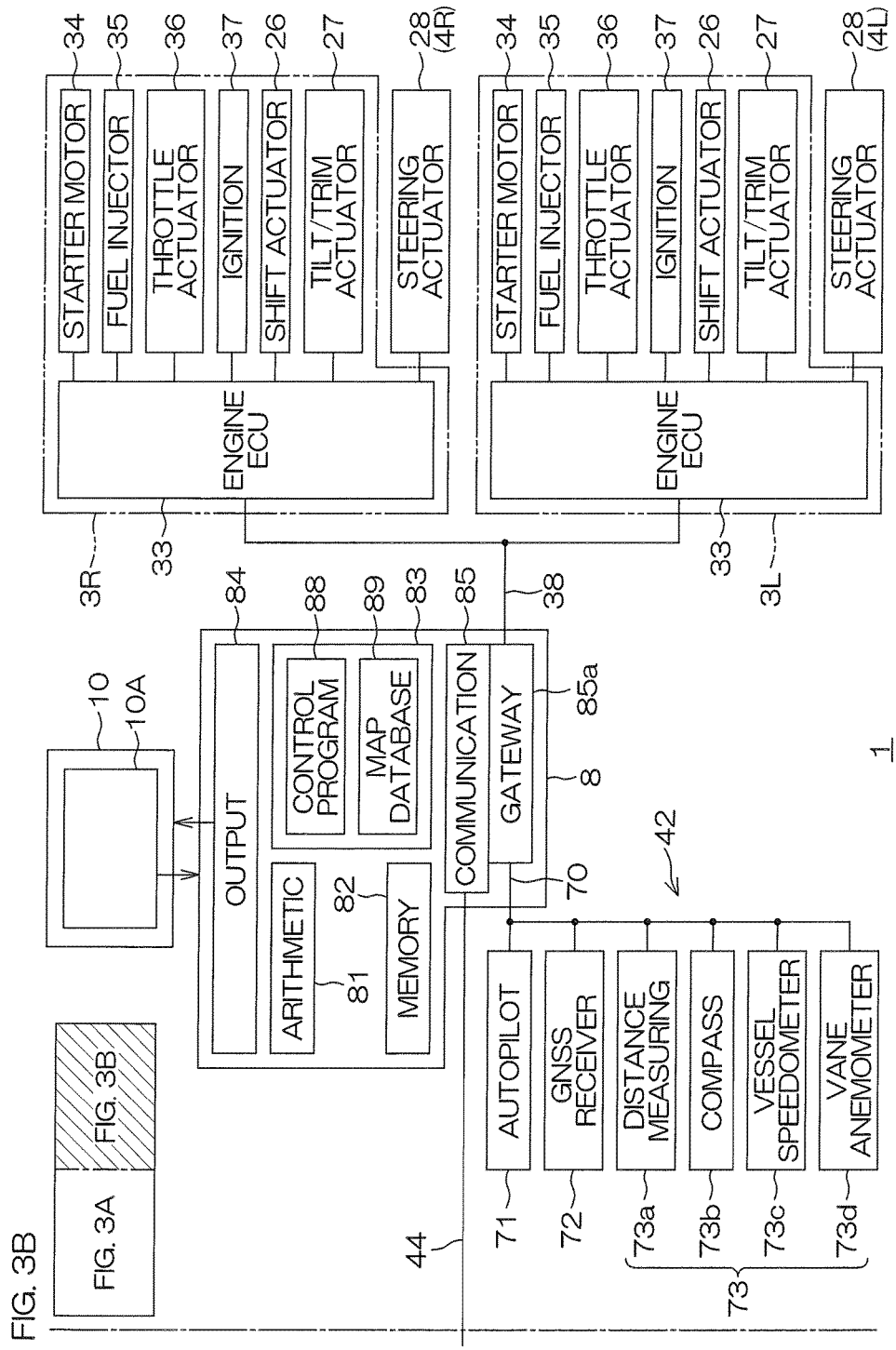

FIGS. 3A and 3B show a block diagram for describing the electrical arrangement of the small vessel 1. FIGS. 3A and 3B are to be combined as shown in the respective figures to make up the single block diagram. An equipment network system, including the central controller 8, is constructed inside the small vessel 1. The equipment network system includes the outboard motors 3L and 3R, the steering apparatus 6, the remote controller 7, the central controller 8, the display device 10, a first additional function system 41 and a second additional function system 42.

Each outboard motor 3 preferably includes an engine ECU (electronic control unit) 33, a starter motor 34, a fuel injector 35, a throttle actuator 36, an ignition device 37, the shift actuator 26, the tilt/trim actuator 27, etc. The engine ECU 33 is configured or programmed to control operations of the starter motor 34, the fuel injector 35, the throttle actuator 36, the ignition device 37, the shift actuator 26, and the tilt/trim actuator 27. Further, the engine ECU 33 is configured or programmed to control the steering actuator 28 of the steering mechanism 4.

The starter motor 34 starts the engine 12. The fuel injector 35 injects a fuel supplied to a combustion chamber of the engine 12. The throttle actuator 36 changes an opening degree of a throttle valve of the engine 12. The ignition device 37 ignites an air-fuel mixture inside the combustion chamber. The shift actuator 26 drives the shift rod 25 to switch the position (shift position) of the dog clutch 24 to any of the forward drive position, the neutral position, and the reverse drive position. The tilt/trim actuator 27 turns the outboard motor 3 around the tilt shaft 31. The steering actuator 28 turns the outboard motor 3 around the steering shaft 32.

The engine ECU 33 stores a control program of the engine 12 in an internal memory (not shown). The engine ECU 33 is connected via a communication line 38 to the central controller 8. Output command signals and steering command signals, corresponding to inputs from the steering apparatus 6 and the remote controller 7, are input from the central controller 8 into the engine ECU 33. Also, detection signals of various sensors (not shown) installed in the outboard motor 3 and the steering mechanism 4 are input into the engine ECU 33. Based on the command signals and the detection signals, the engine ECU 33 controls the operations of the starter motor 34, the fuel injector 35, the throttle actuator 36, the ignition device 37, the shift actuator 26, the tilt/trim actuator 27, the steering actuator 28, etc. The engine ECU 33 is configured or programmed to perform communication with the central controller 8 using a CAN (control area network) protocol.

The remote controller 7 includes a remote controller ECU 45. The remote controller ECU 45 is configured or programmed to perform communication with the central controller 8 via a communication line 44. In the present preferred embodiment, the remote controller 7 includes the two levers 7L and 7R and two operation position sensors 47L and 47R respectively detecting operation positions of the levers 7L and 7R. Output signals of the operation position sensors 47L and 47R are input into the remote controller ECU 45 and transmitted from the remote controller ECU 45 to the central controller 8 via the communication line 44. Each of the levers 7L and 7R is an operating member that is configured to be inclined in the front/rear direction. In accordance with the inclination positions in the front/rear direction of the levers 7L and 7R, the central controller 8 provides the output command signals, including a shift command signal and an engine speed command signal, to the engine ECUs 33 of the corresponding outboard motors 3L and 3R. Each engine ECU 33 is thus made to drive the shift actuator 26 in accordance with the shift command signal and the throttle actuator 36 in accordance with the engine speed command signal. Switching of the shift positions of the outboard motors 3L and 3R and changing of the throttle opening degree of the engine 12 is thus performed in accordance with operations of the levers 7L and 7R. The directions of propulsive forces, the generation/non-generation of propulsive force, and outputs of the outboard motors 3L and 3R are thus set. The output of the outboard motor 3 is the magnitude of the propulsive force and, more specifically, is the engine speed.

In the present preferred embodiment, the levers 7L and 7R are respectively provided with tilt switches 48L and 48R. When the tilt switches 48L and 48R are operated, the operation signals are input into the remote controller ECU 45 and further transmitted from the remote controller ECU 45 to the central controller 8 via the communication line 44. In accordance with operations of the tilt switches 48L and 48R, the central controller 8 inputs trim command signals into the engine ECUs 33 of the corresponding outboard motors 3L and 3R. Each engine ECU 33 drives the tilt/trim actuator 27 accordingly. The trim angle of the outboard motor 3 is thus changed.

The steering apparatus 6 includes the steering wheel 61, a steering position sensor 62, and a steering ECU 63. The steering position sensor 62 detects an operation amount, in other words, an operation angle of the steering wheel 61. The operation angle detected by the steering position sensor 62 is transmitted from the steering ECU 63 to the central controller 8 via the communication line 44. The central controller 8 is configured or programmed to provide the steering command signals corresponding to the operation angle to the engine ECUs 33 of the outboard motors 3L and 3R. Each engine ECU 33 is configured or programmed to drive the steering actuator 28 based on the steering command signal. The outboard motor 3 is thus steered in accordance with the operation angle of the steering wheel 61.

The joystick device 9 includes the stick 91 operated by the vessel operator, an inclination position sensor 92 that detects the inclination direction and an inclination amount of the stick 91, a rotation position sensor 93 that detects a rotation position of the stick 91, and a joystick ECU 94. Output signals of the inclination position sensor 92 and the rotation position sensor 93 are input into the joystick ECU 94. The joystick ECU 94 is configured or programmed to generate the course command that is in accordance with the inclination direction of the stick 91, a propulsive force command that is in accordance with the inclination amount of the stick 91, and the turning command that is in accordance with the rotation direction and the rotation amount of the stick 91. The course command, the propulsive force command, and the turning command are input into the central controller 8 via the communication line 44. Based on the course command, the propulsive force command, and the turning command, the central controller 8 generates the output command signals (the shift command signals and the engine speed command signals) and the steering command signals for the respective outboard motors 3L and 3R. That is, the output command signals and the steering command signals are calculated so that the propulsive force expressed by the propulsive force command is generated in the direction expressed by the course command and so that turning of the hull 2 occurs in accordance with the turning command.

The central controller 8 is configured or programmed to have a plurality of control modes. One control mode is a normal mode and another control mode is a joystick mode. In the normal mode, the central controller 8 outputs the steering command signals that are in accordance with the operation angle of the steering wheel 61 and outputs the shift command signals and the engine speed command signals that are in accordance with the operation positions of the levers 7L and 7R of the remote controller 7. In the joystick mode, the central controller 8 outputs the output command signals and the steering command signals that are in accordance with the output signals (the course command, propulsive force command, and turning command) of the joystick device 9. In the present preferred embodiment, the central controller 8 further is configured or programmed to have an autopilot mode and an automatic berthing mode as control modes.

The first additional function system 41 includes a wiper 51, a horn 52, a sonar 53, a bilge pump 54, a livewell pump 55, a vessel light 56, a speaker 57, a camera 58, and various measuring equipment 59. These equipment constituting the first additional function system 41 is connected to the central controller 8 via the communication line 44.

The wiper 51 is mounted on a front windshield in front of the vessel operator compartment 5 and wipes off water drops on the outer surface of the front windshield. The horn 52 generates a warning sound (alarm). The sonar 53 is a device that emits sound waves in the water in a periphery of the hull 2 to measure the position of an underwater object and is used to find a school of fish underwater, etc. The bilge pump 54 is a pump that pumps water retained at the vessel bottom to the exterior. The livewell pump 55 is a pump that replaces the water in a livewell provided in the hull 2. The vessel light 56 is a lighting device included in the small vessel 1 and may be a mast head light, stern light, anchor light, navigation light, cabin light, etc. The speaker 57 is arranged inside the vessel and outputs sounds. The camera 58 is a device that takes an image of a periphery of the small vessel 1 and generates electronic data (image data) of the image taken. The image data output by the camera 58 are transmitted to the central controller 8. A plurality of the cameras 58 may be included. Specifically, a rear camera 58A that takes an image of the rear of the hull 2 or a periphery camera 58B necessary for synthesizing planar images of the periphery of the hull 2 (so-called around view) preferably is included. The various measuring equipment 59 preferably includes a fuel flow meter 59*a*, etc. The fuel flow meter 59*a* is a device that measures the flow rate of fuel fed to the engine 12.

The second additional function system 42 includes an autopilot device 71, a GNSS receiver 72, and various measuring equipment 73. This equipment constituting the second additional function system 42 are connected to the central controller 8 via a communication line 70.

The autopilot device 71 is a device that is configured to maintain a set course. More specifically, it is a device, which, when a destination is set, plans a route from a current position to the destination by automatic calculation and sets the course in accordance with the planned route. When an actual course of the small vessel 1 deviates from the set course, the autopilot device 71 transmits a command signal to correct the course of the small vessel 1 to the central controller 8. Based on the command signal from the autopilot device 71, the central controller 8 transmits the steering command signals to correct the course to the engine ECUs 33 of the outboard motors 3L and 3R. The engine ECU 33 of each outboard motor 3 thus controls the steering actuator 28 in accordance with the steering command signals for course correction. The course of the small vessel 1 is thus corrected.

The GNSS receiver 72 is a receiver of GNSS (global navigation satellite systems), such as GPS, and is a current position detection unit that measures the current position of the small vessel 1. The various measuring equipment 73 include a distance measuring unit 73*a*, a compass 73*b*, a vessel speedometer 73*c*, a vane anemometer 73*d*, etc. The distance measuring unit 73*a* uses a sonar, laser, camera image, etc., to measure a distance from the small vessel 1 to an object (for example, a docking object). The compass 73*b* may include, for example, a geomagnetic sensor, etc., and measures a bow direction of the small vessel 1 (the heading of the hull 2). The vessel speedometer 73*c* measures the running speed of the small vessel 1. The vane anemometer 73*d* measures a wind direction and wind speed around the small vessel 1.

The central controller 8 is configured or programmed to function as a network host of the equipment network system. Also, the central controller 8 is an example of a vessel running controlling apparatus according to a preferred embodiment of the present invention. The central controller 8 includes an arithmetic device 81, such as a CPU, etc., a memory 82, a storage device 83, an output device 84, and a communication device 85. The storage device 83 may be a fixed storage medium arranged from a hard disk or flash memory, etc., or may be a detachable storage medium, such as a memory card or a USB memory, etc. A control program 88 executed by the arithmetic device 81 and a map database 89 are stored in the storage device 83. By the arithmetic device 81 executing the control program, the central controller 8 realizes functions as a plurality of functional processing units. A map data that is referenced when the current position and route of the small vessel 1 are to be displayed on the display device 10 is registered in the map database 89.

The output device 84 is a device that outputs image signals to the display device 10. The communication device 85 is a device that is configured to perform communication with the outboard motors 3L and 3R, the steering apparatus 6, the remote controller 7, the first additional function system 41, and the second additional function system 42. The communication device 85 includes a plurality of ports to which the outboard motors 3L and 3R, the steering apparatus 6, the remote controller 7, the first additional function system 41, and the second additional function system 42 are connected. The communication device 85 may have a gateway 85a arranged to connect the second additional function system 42.

The equipment of the first additional function system 41 includes, for example, equipment provided by the manufacturer of the outboard motors 3. The communication line 44 connected to this equipment is thus connected directly to the communication device 85. The steering apparatus 6, the remote controller 7, and the joystick device 9 are also equipment provided by the manufacturer of the outboard motor 3 and these equipment are also connected directly to the communication device 85 by the communication line 44. The communication line 38 connected to the outboard motors 3L and 3R is also connected directly to the communication device 85.

On the other hand, the equipment of the second additional function system 42 may be equipment made by so-called third parties that differ from the manufacturer of the outboard motors 3. The communication line 70 connected to the equipment of the second additional function system 42 is connected to the communication device 85 via the gateway 85a.

The display device 10 displays information on the small vessel 1 via a GUI (graphical user interface). The display device 10 displays information on the equipment connected to the central controller 8. The display device 10 may, for example, be a liquid crystal display or an organic EL (electro-luminescence) display, etc. The display device 10 preferably includes a touch panel function. That is, a touch panel 10A is provided on the display screen of the display device 10. An output signal of the touch panel 10A is input into the central controller 8. A user can operate the touch panel 10A to switch the display screen of the display device 10 or operate a displayed button (software key) to perform operation of equipment included in the small vessel 1, etc.

Figure 4:
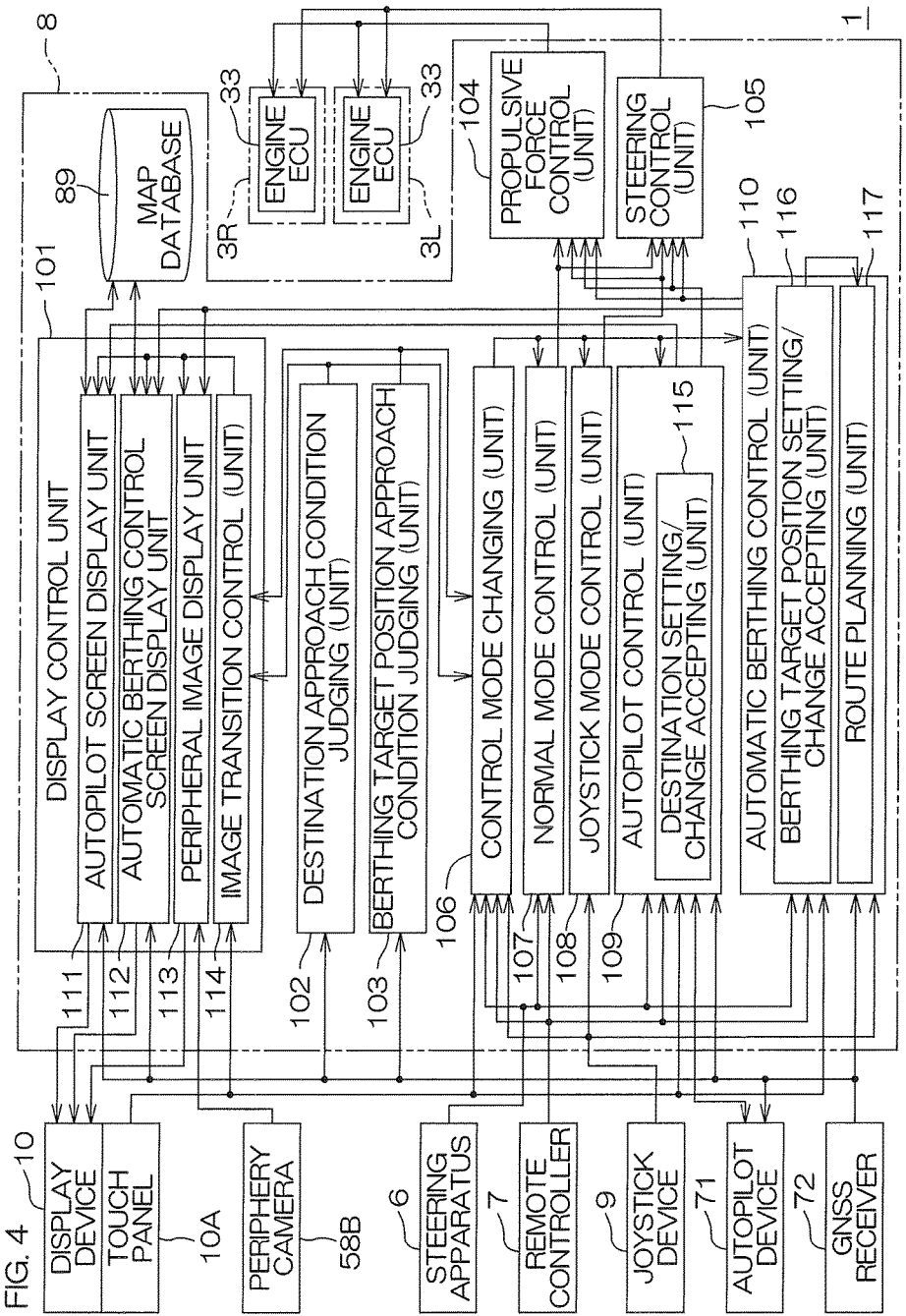
FIG. 4 is a block diagram for describing a functional arrangement of a central controller of the small vessel.

FIG. 4 is a block diagram for describing the functional arrangement of the central controller 8. The central controller 8 is configured or programmed to include a plurality of functional processing units that are preferably embodied or provided in software form by the arithmetic device 81 executing the control program 88. The plurality of functional processing units include a display control unit 101, a destination approach condition judging unit 102, a berthing target position approach condition judging unit 103, a propulsive force control unit 104, a steering control unit 105, a control mode changing unit 106, a normal mode control unit 107, a joystick mode control unit 108, an autopilot control unit 109 and an automatic berthing control unit 110.

The display control unit 101 supplies screen data to be displayed on the display device 10 to the output device 84 to control the display on the display device 10. The display control unit 101 includes an autopilot screen display unit 111, an automatic berthing control screen display unit 112, a peripheral image display unit 113, and a screen transition control unit 114.

The autopilot screen display unit 111 makes an autopilot screen be displayed on the display device 10 when the control mode of the central controller 8 is the autopilot mode. The autopilot mode is a control mode in which the course is set automatically using the function of the autopilot device 71. The autopilot mode is an automatic vessel maneuvering mode that is appropriate for a case where the distance from the current position to the destination is not less than several hundred meters, for example. The autopilot screen is a screen for autopilot and includes map information that includes the current position of the small vessel 1. That is, the autopilot screen display unit 111 acquires the current position information output by the GNSS receiver 72 and searches the map database 89 based on the current position information. The autopilot screen display unit 111 makes a map of a predetermined scale that includes the current position be displayed on the display device 10. Further, the autopilot screen display unit 111 makes a current position icon, indicating the current position of the small vessel 1, be displayed on the map. Also, the autopilot screen display unit 111 makes a destination icon, indicating the destination, be displayed on the map. Further, the autopilot screen display unit 111 makes a planned route from the current position to the destination be displayed on the map. The autopilot device 71 calculates the planned route based on the current position and the destination of the small vessel 1 and passes it to the autopilot control unit 109. The display of the planned route is, for example, a line (a straight line, a curve, or a broken line) joining the current position icon and the destination icon.

The automatic berthing control screen display unit 112 makes an automatic berthing control screen be displayed on the display device 10 when the control mode of the central controller 8 is the automatic berthing mode. The automatic berthing mode is an automatic vessel maneuvering mode in which a specific berthing target position is designated when a marina, etc., of the destination is approached and the small vessel 1 is guided to the berthing target position. The automatic berthing mode is an automatic vessel maneuvering mode that is appropriate for a case where the distance from the current position to the destination is not more than several dozen meters, for example. In the automatic berthing mode, the propulsive forces and the steering angles of the outboard motors 3 are controlled automatically. The automatic berthing control screen is a screen for the automatic berthing mode and includes map information that includes the current position of the small vessel 1. That is, the automatic berthing control screen display unit 112 acquires the current position information output by the GNSS receiver 72 and searches the map database 89 based on the current position information. The automatic berthing control screen display unit 112 makes a map of a predetermined scale that includes the current position be displayed on the display device 10. This map is a detailed map of larger scale than the map displayed in the autopilot screen. The automatic berthing control screen display unit 112 makes the current position icon, indicating the current position of the small vessel 1, be displayed on the detailed map. Also, the automatic berthing control screen control display unit 112 makes a berthing target position icon, indicating the berthing target position, be displayed on the detailed map. Further, the automatic berthing control screen display unit 112 makes the planned route from the current position to the berthing target position be displayed. The planned route is calculated by the automatic berthing control unit 110 based on the current position and the berthing target position of the small vessel 1. The display of the planned route is, for example, a line (a straight line, a curve, or a broken line) joining the current position icon and the berthing target position icon.

The peripheral image display unit 113 makes a peripheral image (so-called around view) of the small vessel 1 be displayed on the display device 10. The peripheral image display unit 113 synthesizes images taken by the periphery camera 58B to prepare a peripheral image and makes the peripheral image be displayed on the display device 10.

The screen transition control unit 114 makes the screen displayed on the display device 10 transition by alternatively actuating the autopilot screen display unit 111, the automatic berthing control screen display unit 112, and the peripheral image display unit 113. Specifically, it makes the autopilot screen transition to the automatic berthing control screen or makes the automatic berthing control screen transition to the peripheral image.

The destination approach condition judging unit 102 judges whether or not a predetermined destination approach condition is satisfied when the control mode of the central controller 8 is the autopilot mode. The destination approach condition is a condition that is satisfied when the small vessel 1 has sufficiently approached the destination. A specific example of the destination approach condition is that the distance between the current position and the destination of the small vessel 1 is not more than a predetermined threshold. In this case, the destination approach condition judging unit 102 acquires the current position information output by the GNSS receiver 72 and calculates the distance between the current position and the destination. If the calculated distance is not more than the threshold, the destination approach condition judging unit 102 judges that the destination approach condition is satisfied. The threshold may be set to a distance such that both the current position and the destination of the small vessel 1 preferably is displayed on the detailed map displayed in the automatic berthing control screen. Another specific example of the destination approach condition is that the current position of the small vessel 1 reaches a predetermined area that includes the destination. For example, the destination approach condition is satisfied when the small vessel 1 reaches an entrance of a harbor that includes the destination. In this case, the destination approach condition judging unit 102 judges whether or not the current position output by the GNSS receiver 72 belongs in the predetermined area or judges whether or not the distance to the predetermined area is not more than a predetermined threshold.

If the destination approach condition judging unit 102 judges that the destination approach condition is satisfied, the judgment result is passed to the screen transition control unit 114. In response to the satisfying of the destination approach condition, the screen transition control unit 114 switches the control of the display on the display device 10 from the control by the autopilot screen display unit 111 to the control by the automatic berthing control screen display unit 112. The screen transition control unit 114 thus performs automatic transition of the screen displayed on the display device 10 from the autopilot screen to the automatic berthing control screen.

The judgment result of the destination approach condition judging unit 102 is also provided to the control mode changing unit 106. In accordance with the judgment result, the control mode changing unit 106 changes the control mode of the central controller 8 from the autopilot mode to the automatic berthing mode.

The berthing target position approach condition judging unit 103 judges whether or not a predetermined berthing target position approach condition is satisfied when the control mode of the central controller 8 is the automatic berthing mode. The berthing target position approach condition is a condition that is satisfied when the small vessel 1 has sufficiently approached the berthing target position. A specific example of the berthing target position approach condition is that the distance between the current position and the berthing target position of the small vessel 1 is not more than a predetermined threshold. In this case, the berthing target position approach condition judging unit 103 acquires the current position information output by the GNSS receiver 72 and calculates the distance between the current position and the berthing target position. If the calculated distance is not more than the threshold, the berthing target position approach condition judging unit 103 judges that the berthing target position approach condition is satisfied. The threshold may be a distance set so that an image of a berthing object (a pier, etc.) is included in the peripheral image.

If the berthing target position approach condition judging unit 103 judges that the berthing target position approach condition is satisfied, the judgment result is passed to the screen transition control unit 114. In response to the satisfying of the berthing target position approach condition, the screen transition control unit 114 switches the control of the display on the display device 10 from the control by the automatic berthing control screen display unit 112 to the control by the peripheral image display unit 113. The screen transition control unit 114 thus performs automatic transition of the screen displayed on the display device 10 from the automatic berthing control screen to the peripheral image.

The judgment result of the berthing target position approach condition judging unit 103 may also be provided to the control mode changing unit 106. In accordance with the judgment result, the control mode changing unit 106 changes the control mode of the central controller 8 from the automatic berthing mode to the joystick mode. Alternatively, the control mode changing unit 106 may keep the control mode unchanged and maintain the automatic berthing mode.

The propulsive force control unit 104 outputs the output command signals (shift command signals and engine speed command signals) to the engine ECUs 33 of the outboard motors 3L and 3R. The steering control unit 105 outputs the steering command signals to the engine ECUs 33 of the outboard motors 3L and 3R. In the normal mode, the propulsive force control unit 104 and the steering control unit 105 prepares the output command signals and the steering command signals for the respective outboard motors 3L and 3R based on output command signals and steering command signals provided from the normal mode control unit 107 and outputs the prepared signals to the corresponding engine ECUs 33. Similarly, in the joystick mode, the propulsive force control unit 104 and the steering control unit 105 prepares the output command signals and the steering command signals for the respective outboard motors 3L and 3R based on output command signals and steering command signals provided from the joystick mode control unit 108 and outputs the prepared signals to the corresponding engine ECUs 33. Similarly in the autopilot mode, the propulsive force control unit 104 and the steering control unit 105 prepares the output command signals and the steering command signals for the respective outboard motors 3L and 3R based on output command signals and steering command signals provided from the autopilot control unit 109 and outputs the prepared signals to the corresponding engine ECUs 33. Similarly, in the automatic berthing mode, the propulsive force control unit 104 and the steering control unit 105 prepares the output command signals and the steering command signals for the respective outboard motors 3L and 3R based on output command signals and steering command signals provided from the automatic berthing control unit 110 and outputs the prepared signals to the corresponding engine ECUs 33. The respective outboard motors 3L and 3R and steering mechanisms 4L and 4R are thus controlled in accordance with each mode.

The control mode changing unit 106 switches the control mode of the central controller 8. For example, the user is able to switch the control mode of the central controller 8 to the normal mode, the joystick mode, the autopilot mode, or the automatic berthing mode manually by performing an operation on the touch panel 10A. That is, the control mode changing unit 106 switches the control mode of the central controller 8 in accordance with the mode switching input operation performed on the touch panel 10A.

Further, when, in the autopilot mode, the destination approach condition judging unit 102 judges that the destination approach condition is satisfied, the control mode changing unit 106 performs automatic transition of the control mode to the automatic berthing mode. When, in the automatic berthing mode, the berthing target position approach condition judging unit 103 judges that the berthing target position approach condition is satisfied, the control mode changing unit 106 preferably performs automatic transition of the control mode to the joystick mode. Alternatively, even when the berthing target position approach condition is satisfied, the control mode changing unit 106 preferably maintains the control mode at the automatic berthing mode.

Also, when, in the joystick control mode, the steering wheel 61 or the lever 7L or 7R is operated by not less than a predetermined operation amount, the control mode changing unit 106 preferably performs automatic transition of the control mode to the normal mode. Oppositely, when an operation input from the joystick device 9 is provided in the normal mode, the control mode preferably is automatically transitioned to the joystick mode.

The normal mode control unit 107 generates the steering command signals based on the output signal of the steering apparatus 6 in the normal mode. Also, the normal mode control unit 107 generates the output command signals that include the shift command signals and the engine speed command signals based on the output signals of the remote controller 7 in the normal mode.

The joystick mode control unit 108 generates the steering command signals, the shift command signals, and the engine speed command signals based on the course command signal, the propulsive force command signal, and the turning command signal output by the joystick device 9 in the joystick mode. The small vessel 1 is thus made to move and turn in accordance with the inclination and rotation of the stick 91 of the joystick device 9. When the rotation position of the stick 91 is maintained at neutral, the small vessel 1 undergoes parallel movement in the inclination direction without turning and the movement speed thereof is in accordance with the inclination amount of the stick 91. Also, when the stick 91 is rotated with the inclination position of the stick 91 being maintained at neutral, the small vessel 1 preferably is made to turn in a state where its movement is significantly reduced or prevented (i.e., made to perform so-called turning on the spot). The turning direction and the turning speed of the vessel 1 are set in accordance with the rotation direction and rotation amount of the stick 91. If both the rotation amount and the inclination amount of the stick 91 are not zero, the small vessel 1 moves while turning.

The autopilot control unit 109 includes a destination setting/change accepting unit 115. The destination setting/change accepting unit 115 accepts a destination setting input or a destination changing input that the user performs by operating the touch panel 10A. The autopilot control unit 109 provides the set or changed destination information to the autopilot device 71. The autopilot control unit 109 also acquires the current position information from the GNSS receiver 72 and provides the information to the autopilot device 71. Based on the provided current position and destination information, the autopilot device 71 plans a route from the current position to the destination and provides the planned route information to the autopilot control unit 109. The autopilot device 71 acquires the current position information periodically from the GNSS receiver 72 to renew the planned route. Further, the autopilot device 71 provides the course command signal, to navigate the small vessel 1 along the planned route, to the autopilot control unit 109. The autopilot control unit 109 supplies the planned route information to the autopilot screen display unit 111. Further in the autopilot mode, the autopilot control unit 109 generates the steering command signals based on the course command signal provided from the autopilot device 71. Also in the autopilot mode, the autopilot control unit 109 generates the output command signals, including the shift command signals and the engine speed command signals, based on the output signals of the remote controller 7. When in the autopilot mode, the output of the steering apparatus 6 changes by not less than a predetermined amount and it is detected that the vessel operator has operated the steering wheel 61, the autopilot control unit 109 gives priority to the output of the steering apparatus 6. That is, the steering command signals are generated based on the output of the steering apparatus 6 regardless of the course command signal from the autopilot device 71.

The automatic berthing control unit 110 includes a berthing target position setting/change accepting unit 116 and a route planning unit 117. The berthing target position setting/change accepting unit 116 accepts a berthing target position setting input or a berthing target position changing input that the user performs by operating the touch panel 10A. The set or changed berthing target position information is passed to the route planning unit 117. The berthing target position information may include attitude designation information that designates the attitude of the small vessel 1 at the berthing position. The route planning unit 117 acquires the current position information from the GNSS receiver 72. The route planning unit 117 plans a route from the current position to the berthing target position to generate planned route information. The route planning unit 117 acquires the current position information periodically from the GNSS receiver 72 and renews the planned route each time. The automatic berthing control unit 110 determines a course to navigate the small vessel 1 along the planned route prepared by the route planning unit 117 and generates steering command signals that are in accordance with the course. The automatic berthing control unit 110 provides the output command signals to the engine ECUs 33 of the respective outboard motors 3 so that the small vessel 1 runs at a predetermined low speed. When the berthing target position is approached, the small vessel 1 may have to undergo turning or parallel movement. Such special vessel behavior is achieved by a combination of steering angle control and propulsive force control (control of direction and magnitude) of the outboard motors 3. The automatic berthing control unit 110 measures the distance from a docking object (a pier, etc.) at the berthing target position and the bow direction (heading of the hull 2), calculates the propulsive force and the steering angle necessary for the movement and turning of the vessel 1 based on the measurement result, and generates the output command signals and the steering command signals accordingly. The measurement of the distance from the small vessel 1 to the docking object preferably is performed using the distance measuring unit 73a. Also, the heading of the hull 2 is measured by the compass 73b. The automatic berthing control unit 110 acquires the respective measurement results from the distance measuring unit 73a and the compass 73b to determine the propulsive forces and the steering angles to be output by the outboard motors 3.

When a lever of the remote controller 7 is operated in the automatic berthing mode, the automatic berthing control unit 110 preferably generates the output command signals, including the shift command signals and the engine speed command signals, based on the output signals of the remote controller 7. When in the automatic berthing mode, the output of the steering apparatus 6 changes by not less than a predetermined amount and it is detected that the vessel operator has operated the steering wheel 61, the automatic berthing control unit 110 gives priority to the output of the steering apparatus 6. That is, the automatic berthing control unit 110 generates the steering command signals based on the output of the steering apparatus 6 regardless of the course calculated based on the planned route. Also, when signals from the joystick device 9 are input in the automatic berthing mode, the automatic berthing control unit 110 gives priority to the outputs of the joystick device 9 and generates the steering command signals and the output command signals based on the outputs.

Figure 5:
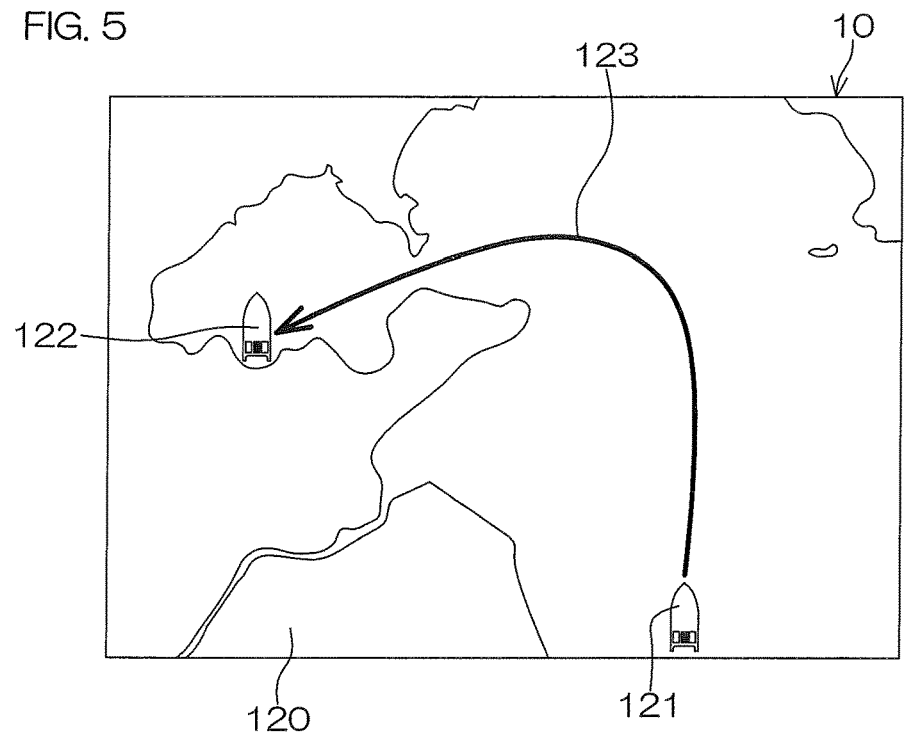
FIG. 5 shows an example of an autopilot screen displayed on a display device in an autopilot mode.

FIG. 5 shows an example of an autopilot screen that is displayed on the display device 10 in the autopilot mode. The autopilot screen includes a map 120 that includes the current position of the small vessel 1 and a current position icon 121 that expresses the current position of the small vessel 1. The scale of the map may be selected so that the current position and the destination are included within the screen. The autopilot screen shown in FIG. 5 also includes a destination icon 122 indicating the destination of the small vessel 1.

In the example of FIG. 5, both the current position icon 121 and the destination icon 122 preferably are vessel icons having boat-shaped graphic forms designed based on a planar shape of the small vessel 1. Preferably, the current position icon 121 and the destination icon 122 are displayed in distinguishable modes. The icons 121 and 122 may be distinguished, for example, by icon color, blinking display/continuous display, providing or not providing of a flag mark, etc.

The autopilot screen shown in FIG. 5 further includes a display 123 of the planned route from the current position to the destination. In the present example, the planned route display 123 is expressed by a curve drawn between the current position icon 121 and the destination icon 122. The planned route is a continuous water route leading from the current position to the destination and is planned based on the map database 89 so as to avoid obstacles and avoid navigation prohibited areas. The planned route display 123 is preferably displayed as a line of a color that is easily distinguished clearly from other displays on the map 120.

Figure 6:
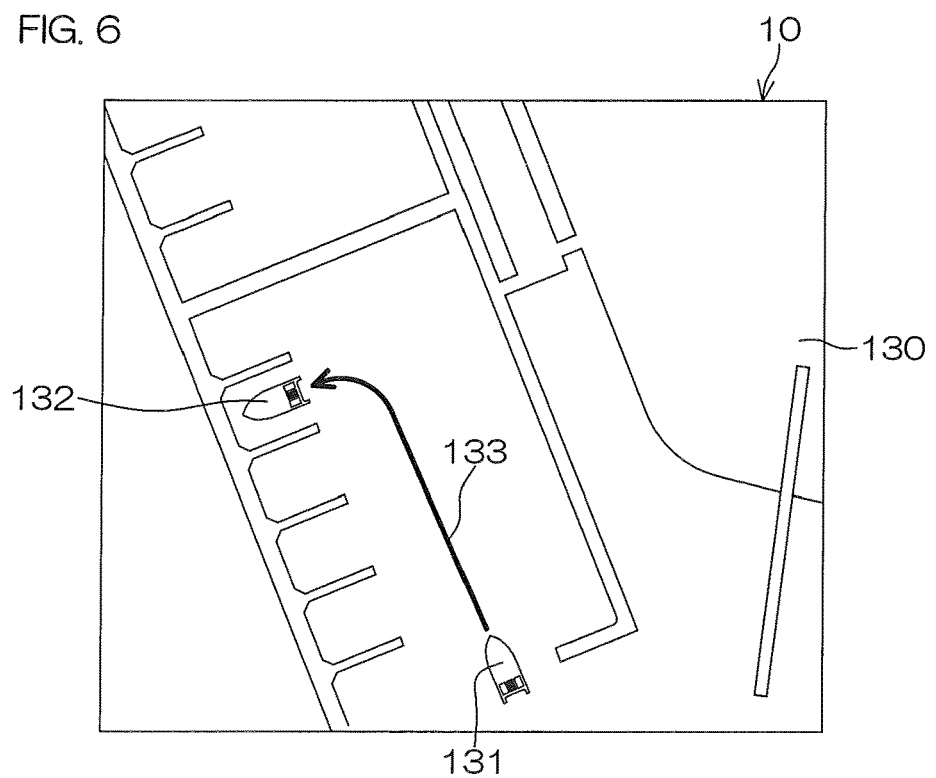
FIG. 6 shows an example of an automatic berthing control screen displayed on the display device in an automatic berthing mode.

FIG. 6 shows an example of an automatic berthing control screen displayed on the display device 10 in the automatic berthing mode. The automatic berthing control screen includes a detailed map 130 of a larger scale than that of the autopilot screen. The detailed map 130 is a map of a predetermined scale that includes the current position of the small vessel 1 and both the current position and the berthing target position are included within the screen. The detailed map 130 is preferably of a scale such that the circumstances of the berthing target position of the small vessel 1 are easily ascertained. Specifically, it is of a scale such that a graphic display of a docking object (a pier, etc.), at which the small vessel 1 can dock and berth, is included. The automatic berthing control screen further includes a current position icon 131 indicating the current position of the small vessel 1. The automatic berthing control screen shown in FIG. 6 further includes a berthing target position icon 132 indicating the berthing target position of the small vessel 1.

In the example of FIG. 6, both the current position icon 131 and the berthing target position icon 132 are vessel icons having boat-shaped graphic forms designed based on the planar shape of the small vessel 1. The current position icon 131 thus expresses not only the current position of the small vessel 1 but also the current course or direction of the small vessel 1. Also, the berthing target position icon 132 expresses not only the berthing target position but also a berthing target attitude. Preferably, the current position icon 131 and the berthing target position icon 132 are displayed with sizes corresponding to the actual size of the small vessel 1 in accordance with the scale of the detailed map 130. Preferably, the current position icon 131 and the berthing target position icon 132 are displayed in distinguishable modes. The icons 131 and 132 may be distinguished, for example, by icon color, blinking display/continuous display, providing or not providing of a flag mark, etc.

The automatic berthing control screen shown in FIG. 6 further includes a display 133 of the planned route from the current position to the berthing target position. In the present example, the planned route display 133 preferably is expressed by a curve drawn between the current position icon 131 and the berthing target position icon 132. The planned route is a continuous water route leading from the current position to the berthing target position and is planned based on the map database 89 so as to avoid obstacles and avoid navigation prohibited areas. The planned route display 133 is preferably displayed as a line of a color that is easily distinguished clearly from other displays on the detailed map 130.

FIG. 7 shows an example of the peripheral image synthesized based on images taken by the periphery camera 58B. The peripheral image is a plan-view image indicating the circumstances of the periphery of the small vessel 1. An actual image 141 of the periphery of the small vessel 1 is displayed at a periphery of a vessel icon 140 designed after the planar shape of the small vessel 1. The vessel icon 140 expresses the actual size, shape, and attitude of the small vessel 1 within the peripheral image. The peripheral image is displayed on the display device 10 after the berthing target position has been approached sufficiently.

The vessel operator is able to move or change the direction of the vessel icon 140 on the screen via the touch panel 10A. That is, the vessel icon 140 preferably is moved or rotated by dragging by a finger 145, for example. The central controller 8 determines propulsive force and turning target values to produce a hull behavior corresponding to the operation performed on the vessel icon 140 and generates the output command signals (the shift command signals and the engine speed command signals) and the steering command signals accordingly. The hull behavior desired by the vessel operator is thus achieved. The vessel operator thus performs vessel maneuvering to achieve docking by performing an intuitive operation on the vessel icon 140 while ascertaining the positions of a docking object (a pier, etc.) 142 at the berthing target position and the small vessel 1 and ascertaining obstacles.

Such an operation preferably is realized by an action of the automatic berthing control unit 110. That is, upon movement or rotation of the vessel icon 140, the berthing target position setting/change accepting unit 116 accepts the position of the vessel icon 140 after the movement/rotation as a new berthing target position. The route planning unit 117 calculates the planned route based on the new berthing target position. The automatic berthing control unit 110 generates the output command signals and the steering command signals based on the planned route that has been calculated. An automatic docking operation is thus achieved.

The vessel operator is also able to perform vessel maneuvering to dock the small vessel 1 at the docking object 142 using the steering apparatus 6, the joystick device 9, etc., while checking the peripheral image.

FIG. 8A and FIG. 8B are diagrams for respectively describing the setting of the destination and the changing of the destination using the autopilot screen. The autopilot screen preferably is displayed on the display device 10 by starting up the autopilot function by operating the touch panel 10A arranged on the display screen of the display device 10.

An initial screen of the autopilot screen includes the map 120 of the predetermined scale. The map 120 is a map that includes the current position of the small vessel 1. The current position is detected by the GNSS receiver 72 and the current position information is passed to the central controller 8. The central controller 8 reads the map data, including the current position, from the map database 89 and makes the map 120, expressed by the map data, be displayed on the display device 10. Further, the central controller 8 makes the current position icon 121, indicating the current position of the small vessel 1, be displayed so as to be overlaid on or overlapped with the map 120 displayed on the display device 10.

The user operates the touch panel 10A to change the scale as necessary and make the map 120, which includes the destination, be displayed on the display device 10. When a scale changing command is input from the touch panel 10A, the central controller 8 reads map data of the scale after the change from the map database 89 and displays the map data on the display device 10 accordingly.

As shown in FIG. 8A, the user touches the current position icon 121 with a finger 125, drags the current position icon 121 to the destination on the map 120, and, at the destination, releases the finger 125 from the touch panel 10A (performs dropping). The central controller 8 (destination setting/change accepting unit 115) then sets the position at which the drop operation is performed as the destination. The central controller 8 (autopilot screen display unit 111) positions the destination icon 122 at the corresponding position on the map 120. When an inappropriate destination setting is performed, the central controller 8 preferably invalidates the destination setting and forgo the positioning of the destination icon 122 on the screen. Alternatively, when an inappropriate destination setting is performed, the central controller 8 preferably modifies and set the destination at another position in a vicinity of the position at which the drop operation is performed. For example, when the drop operation is performed on a land location, a location of a water depth not more than a fixed value (a so-called shoal), a mooring/berthing prohibited district, a position where interference with a pier or other obstacle occurs, etc., it is preferable to reject the destination setting or to set the destination upon modifying it to a nearby location on water.

The destination setting may be configured to be performed by another operation. Specifically, a configuration may be provided to perform the destination setting not by a drag-and-drop operation but by touching of the destination on the map 120 displayed on the display device 10. For example, when an operation of touching the current position icon 121 is performed, the central controller 8 (destination setting/change accepting unit 115) starts a destination setting operation. In this state, the user performs the touch operation on the destination. The central controller 8 sets the position at which the second touch operation is performed as the destination. As in the cases described above, rejection or automatic modification may be performed for an inappropriate destination setting. If the display device 10 is provided with a scale changing button or a map scrolling button, the user is able to perform the second touch operation to achieve destination setting upon scrolling the map or changing the scale of the map.

If an intended destination setting could not be performed by the drag-and-drop operation or the touch operation or if the destination is to be set anew during navigation, a change of destination is capable of being performed. The change of destination preferably is performed specifically by dragging and dropping the destination icon 122 by the finger 125 as shown in FIG. 8B, for example. The user operates the touch panel 10A with the finger 125 to drag the destination icon 122 and drop the destination icon 122 at the desired position. In response to the drop operation, the central controller 8 (destination setting/change accepting unit 115) sets the position at which the drop operation is performed as the new destination.

A configuration preferably is also provided to enable the destination to be changed by touch operations. For example, the central controller 8 preferably starts the destination changing operation when the destination icon 122 is touched. When the user then touches the changed destination on the map 120, the central controller 8 (destination setting/change accepting unit 115) sets the position at which the second touch operation is performed as the new destination. The setting of the destination is thus able to be changed.

When the destination is set or changed, the display 123 of the planned route, calculated based on the set or changed destination and the current position, is displayed so as to be overlaid on or overlapped with the map 120. In FIG. 8B, the planned route display 123 before a change of destination is indicated by alternate long and two short dashed line and the planned route display 123 after the change of destination is indicated by a solid line.

If a new destination is set by the drag-and-drop operation from the current position, the planned route preferably is calculated to approximate the route of dragging on the map.

Figure 9A:
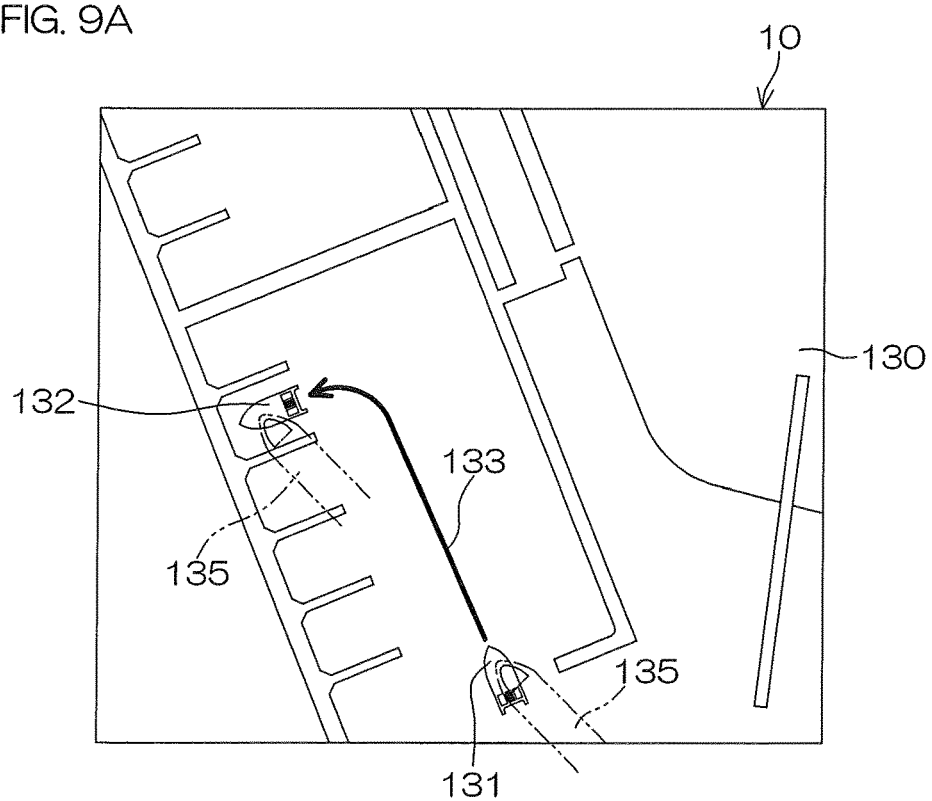
FIG. 9A and FIG. 9B are diagrams for respectively describing a setting of a berthing target position and a changing of the berthing target position using the automatic berthing control screen.
Figure 9B:
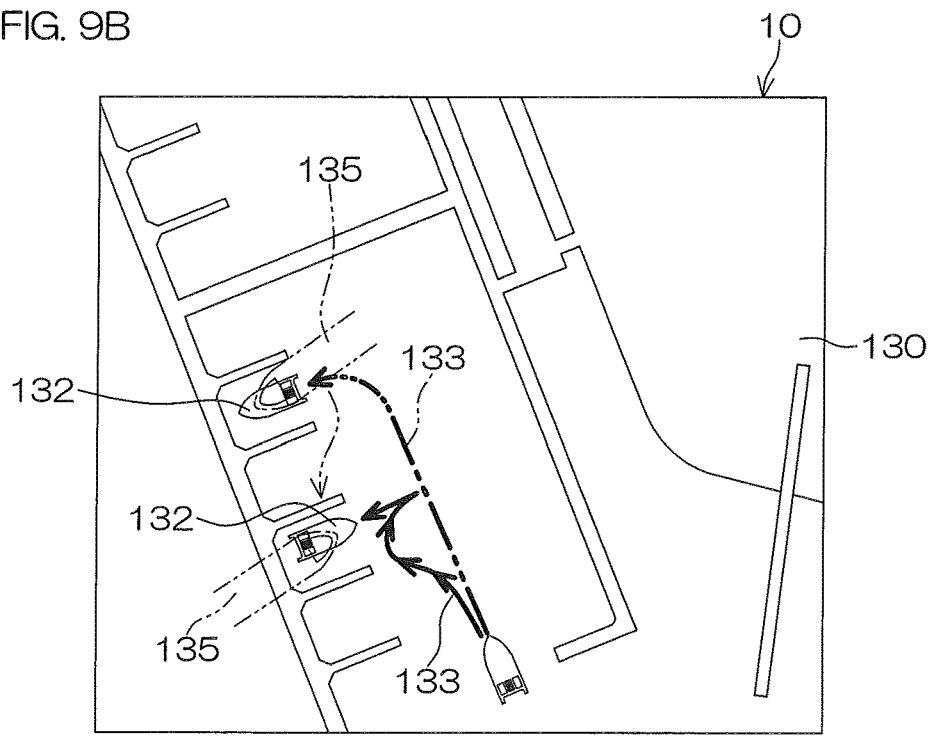

FIG. 9A and FIG. 9B are diagrams for respectively describing the setting of the berthing target position and the changing of the berthing target position using the automatic berthing control screen. While running using the autopilot function, when the destination is approached and the destination approach condition is satisfied, the central controller 8 (control mode changing unit 106) automatically changes the control mode from the autopilot mode to the automatic berthing mode. The switching of the control mode preferably is performed manually by operation of the touch panel 10A. When the automatic berthing mode is started, the central controller 8 (automatic berthing control screen display unit 112) makes the automatic berthing control screen be displayed on the display device 10.

An initial screen of the automatic berthing control screen includes the detailed map 130 of the predetermined scale. The detailed map 130 is a map that is more detailed than the map displayed in the initial screen of the autopilot screen.

The detailed map 130 is a map that includes the current position of the small vessel 1. The current position is detected by the GNSS receiver 72 and the current position information is passed to the central controller 8. The central controller 8 reads the map data, including the current position, from the map database 89 and makes the detailed map 130, expressed by the map data, be displayed on the display device 10. Further, the central controller 8 makes a current position icon 131, indicating the current position of the small vessel 1, be displayed on the detailed map 130 displayed on the screen of the display device 10.

The user operates the touch panel 10A to change the scale as necessary and make the detailed map 130, which includes the berthing target position, be displayed on the display device 10. When a scale changing command is input from the touch panel 10A, the central controller 8 reads map data of the scale after the change from the map database 89 and displays the map data on the display device 10 accordingly.

As shown in FIG. 9A, the user touches the current position icon 131 with a finger 135, drags the current position icon 131 to the berthing target position on the detailed map 130, and, at the berthing target position, releases the finger 135 from the touch panel 10A (performs dropping). The central controller 8 (berthing target position setting/change accepting unit 116) then sets the position at which the drop operation is performed as the berthing target position. The central controller 8 (automatic berthing control screen display unit 112) positions the berthing target position icon 132 at the corresponding position on the detailed map 130. When an inappropriate berthing target position setting is performed, the central controller 8 preferably invalidates the berthing target position setting and forgo the positioning of the berthing target position icon 132 on the screen. Alternatively, when the berthing target position is set at an inappropriate position, the central controller 8 preferably modifies and sets the berthing target position at another position in a vicinity of the position at which the drop operation is performed. For example, when the drop operation is performed on a land location, a location of a water depth not more than a fixed value (a so-called shoal), a mooring/berthing prohibited district, a position where interference with a pier or other obstacle occurs, etc., it is preferable to reject the berthing target position setting or to set the berthing target position upon modifying it to a nearby location on water.

The berthing target position setting preferably is configured to be performed by another operation. Specifically, a configuration is provided to perform the berthing target position setting not by a drag-and-drop operation but by touching of the berthing target position on the detailed map 130 displayed on the display device 10. For example, when an operation of touching the current position icon 131 is performed, the central controller 8 (berthing target position setting/change accepting unit 116) starts a berthing target position setting operation. In this state, the user performs the touch operation on the berthing target position. The central controller 8 sets the position at which the second touch operation is performed as the berthing target position. As in the cases described above, rejection or automatic modification preferably is performed for an inappropriate berthing target position setting. If the display device 10 is provided with a scale changing button or a map scrolling button, the user is able to perform the second touch operation for berthing target position setting upon scrolling the map or changing the scale of the map.

If an intended berthing target position could not be set by the drag-and-drop operation or the touch operation or if the berthing target position is to be set anew during navigation toward the berthing target position, a change of berthing target position preferably is performed. The change of berthing target position preferably is performed specifically by dragging and dropping the berthing target position icon 132 as shown in FIG. 9B. The user operates the touch panel 10A with the finger 135 to drag the berthing target position icon 132 and drop the berthing target position icon 132 at the desired position. In response to the drop operation, the central controller 8 (berthing target position setting/change accepting unit 116) sets the position at which the drop operation is performed as the new berthing target position.

A configuration preferably is provided to enable the berthing target position to be changed by touch operations. For example, the central controller 8 (berthing target position setting/change accepting unit 116) preferably starts the berthing target position changing operation when the berthing target position icon 132 is touched. When the user then touches the changed berthing target position on the detailed map 130, the central controller (berthing target position setting/change accepting unit 116) sets the position at which the second touch operation is performed as the new berthing target position. The setting of the berthing target position is thus capable of being changed.

In the automatic berthing control screen, the user is further enabled to perform an operation to set the attitude (direction) of the small vessel 1 at the berthing target position. Specifically, the berthing attitude of the small vessel 1 preferably is set by operation of the touch panel 10A. For example, in a state of touching the berthing target position icon 132 with the finger 135, the user rotates the berthing target position icon 132 on the detailed map 130, and then releases the finger 135 from the berthing target position icon 132 after the icon has been rotated to the desired attitude. In response, the central controller 8 (berthing target position setting/change accepting unit 116) sets the attitude of the small vessel 1 at the berthing target position.

Based on the berthing target position and the vessel attitude that have been set, the central controller 8 (route planning unit 117) calculates the planned route from the current position to the berthing target position. The central controller 8 (automatic berthing control unit 110) determines the course of the small vessel 1 based on the planned route and generates the steering command signals in accordance with the course. The small vessel 1 is thus guided to the berthing target position and berthed in the set attitude.

When the berthing target position is set or changed (including the setting or change of the berthing attitude), the display 133 of the planned route, calculated based on the set or changed berthing target position and the current position, is displayed so as to be overlaid on or overlapped with the detailed map 130. In FIG. 9B, the planned route display 133 before a change of berthing target position is indicated by alternate long and two short dashed line and the planned route display 133 after the change of berthing target position is indicated by a solid line.

If the berthing target position is set by the drag-and-drop operation from the current position, the planned route preferably is calculated to approximate the route of dragging on the map.

FIG. 10 is a flowchart for describing an operation example of the central controller 8. When the user operates the touch panel 10A to perform an autopilot function calling operation (step S1), the central controller 8 starts up the autopilot device 71 and starts the autopilot mode (step S2). The central controller 8 acquires the current position information from the GNSS receiver 72 (step S3) and displays the initial screen of the autopilot screen on the display device 10 (step S4). The initial screen of the autopilot screen includes the map of the predetermined scale including the current position of the small vessel 1 and the current position icon.

When the user operates the touch panel 10A to set or change the destination, the central controller 8 accepts the input of the set or changed destination (step S5). The central controller 8 displays the destination icon, indicating the destination, on the map in the autopilot screen (step S6). The central controller 8 supplies the information on the current position and the set or changed destination of the small vessel 1 to the autopilot device 71. Based on the provided current position and destination information, the autopilot device 71 references the map database 89 and determines a navigable route by calculation to prepare the planned route (step S7). Information on the planned route is provided to the central controller 8. The central controller 8 displays the planned route on the map in the autopilot screen (step S8). The autopilot device 71 outputs the course command signal in accordance with the planned route. The central controller 8 prepares the steering command signals based on the course command signal and supplies the prepared signals to the engine ECUs 33 of the respective outboard motors 3.

Further, the central controller 8 acquires the current position information on the small vessel 1 detected by the GNSS receiver 72 (step S9) to renew the display of the autopilot screen (step S10). Specifically, the display position and direction of the current position icon are changed and the display of the map is renewed as necessary. The central controller 8 monitors whether or not an operation to change the destination is performed from the touch panel 10A (step S11). When a destination changing operation is performed (step S11: YES), a return to step S5 is performed to accept the input (change) of destination change.

Further during the execution of the autopilot mode, the central controller 8 monitors whether or not the destination approach condition is satisfied (step S12). While the destination approach condition is not satisfied (step S12: NO), a return to step S7 is performed, the planned route is calculated based on the current position and the destination, and the calculated planned route is displayed on the map in the autopilot screen (step S8). The planned route and the display thereof are thus renewed in accordance with the current position.

On the other hand, when the current position of the small vessel 1 approaches the destination and the destination approach condition is satisfied (step S12: YES), the central controller 8 switches the control mode from the autopilot mode to the automatic berthing mode (step S13). In accordance with the mode switching, the central controller 8 makes the screen displayed on the display device 10 transition from the autopilot screen to the automatic berthing control screen (step S14). In this process, the central controller 8 preferably stops the propulsive force outputs of the outboard motors 3 temporarily. In displaying the automatic berthing control screen, the central controller 8 reads the detailed map, including the current position, from the map database 89 and displays the detailed map in the automatic berthing control screen. Further, the central controller 8 displays the current position icon so as to be overlaid on or overlapped with the detailed map displayed in the automatic berthing control screen.

When the control mode switches to the automatic berthing mode, the user operates the touch panel 10A to set or change the berthing target position. The central controller 8 then accepts the set or changed berthing target position (step S15). At this step, the central controller 8 also accepts the input of the berthing attitude of the small vessel 1 at the berthing target position (step S15). The central controller 8 displays the berthing target position icon at the berthing target position so as to be overlaid on or overlapped with the detailed map of the automatic berthing control screen (step S16). The direction of the berthing target position icon is in accordance with the berthing attitude that has been input.

The central controller 8 references the map database 89 based on the current position of the small vessel 1, the set or changed berthing target position, and the berthing attitude to determine the navigable route by calculation and thus prepares the planned route (step S17). The central controller 8 determines the course or direction of the small vessel 1 in accordance with the planned route, generates the steering command signals and the output command signals based on the course, and supplies the signals to the engine ECUs 33 of the outboard motors 3. Further, the central controller 8 displays the planned route so as to be overlaid on or overlapped with the detailed map on the automatic berthing control screen (step S18). Further, the central controller 8 acquires the current position of the small vessel 1 detected by the GNSS receiver 72 (step S19) and renews the display of the automatic berthing control screen based on the current position (step S20). Specifically, the display position and direction of the current position icon are changed and the display of the detailed map is renewed as necessary. The central controller 8 monitors whether or not an operation to change the berthing target position is performed from the touch panel 10A (step S21). When a berthing target position changing operation is performed (step S21: YES), a return to step S15 is performed to accept the input (change) of the berthing target position.

Further during the execution of the automatic berthing mode, the central controller 8 monitors whether or not the berthing target position approach condition is satisfied (step S22). While the berthing target position approach condition is not satisfied (step S22: NO), a return to step S17 is performed, the planned route is calculated based on the current position and the berthing target position, and the calculated planned route is displayed on the detailed map in the automatic berthing control screen (step S18). The planned route and the display thereof are thus renewed in accordance with the current position.

On the other hand, when the small vessel 1 approaches the berthing target position and the berthing target position approach condition is satisfied (step S22: YES), the central controller 8 makes the screen displayed on the display device 10 transition from the automatic berthing control screen to the peripheral image (step S23). At this step, the central controller 8 preferably ends the automatic berthing mode or may wait until the distance between the current position and the berthing target position of the small vessel 1 becomes not more than a predetermined threshold and then end the automatic berthing mode.

As described above, with the present preferred embodiment, while the course of the small vessel 1 is being controlled automatically in the autopilot mode, the autopilot screen is displayed on the display device 10. When the small vessel 1 approaches the destination and the destination approach condition is satisfied, the display on the display device 10 automatically transitions from the autopilot screen to the automatic berthing control screen. In the automatic berthing mode, the outboard motors 3 and the steering apparatuses 4 are automatically controlled so that the small vessel 1 is berthed at the berthing target position.

The display on the display device 10 thus transitions automatically from the autopilot screen to the automatic berthing control screen based on the destination approach condition and useful screen displays are thus provided to the user in accordance with the circumstances. The autopilot mode and the automatic berthing mode are thus able to used more readily.

Also with the present preferred embodiment, when the small vessel 1 approaches the berthing target position and the predetermined berthing target position approach condition is satisfied, the display on the display device 10 transitions automatically from the automatic berthing control screen to the peripheral image. The user thus is able to perform vessel maneuvering while checking the actual circumstances of the periphery of the small vessel 1 on the display device 10. Useful screen displays preferably are provided in accordance with the circumstances because the display on the display device 10 thus transitions automatically from the automatic berthing control screen to the peripheral image based on the berthing target position approach condition.

Also, the autopilot screen includes the map that includes the current position of the small vessel 1 and the user thus is able to easily ascertain the current position of the small vessel 1 visually. Further, in the autopilot screen, the current position icon and the destination icon that respectively express the current position and the destination of the small vessel 1 are displayed so as to be overlaid on or overlapped with the map. The circumstances in which the small vessel 1 is running toward the destination are thus able to be easily ascertained visually. Further, the autopilot screen includes the display of the planned route from the current position to the destination and therefore the planned route to the destination is thus able to be easily ascertained visually.

Further, in the automatic berthing control screen, the current position icon is displayed so as to be overlaid on or overlapped with the detailed map that is more detailed than the map of the autopilot screen. The current position icon and the berthing target position are thus sufficiently separated on the screen. The user is thus able to ascertain the relationship between the current position and the berthing target position easily and more useful information is thus able to be provided to the user.

Also, the berthing target position icon is displayed so as to be overlaid on or overlapped with the detailed map of the automatic berthing control screen and the user is thus able to ascertain the relationship between the current position and the berthing target position more easily and is able to visually ascertain the circumstances in which the small vessel 1 is running toward the berthing target position. Further, the planned route from the current position to the berthing target position is displayed on the detailed map of the automatic berthing control screen and the planned route to the berthing target position is thus able to be ascertained visually.

Also, the present preferred embodiment preferably includes the touch panel 10A that is arranged on the display screen of the display device 10 and the destination preferably is set or changed by performing a touch operation on the display screen or performing a tracing operation on the display screen. The operation is thus simple because there is no need to perform input of coordinates of the destination and the use of the autopilot function is thus made easy.

Similarly with the present preferred embodiment, the berthing target position and the berthing target attitude preferably are set or changed by performing a touch operation or a tracing operation on the display screen of the display device 10. The operation is thus simple because there is no need to perform input of coordinates, etc. An automatic berthing mode that is convenient to use is thus provided. Moreover, the display on the display device 10 is automatically switched from the autopilot screen to the automatic berthing control screen when the destination approach condition is satisfied and the user can thus set the berthing target position without having to perform an operation to change the display.

In the peripheral image (see FIG. 7), the vessel icon 140 is operated and the vessel operator preferably perform operations (movement and rotation) on the vessel icon 140. In accordance with the operations performed on the vessel icon 140, the central controller 8 controls the propulsive forces and the steering angles of the outboard motors 3. Hull behavior that is in accordance with the operations performed on the vessel icon 140 is thus obtained. Vessel maneuvering for docking, etc., is thus able to be performed by intuitive operations.

Although preferred embodiments of the present invention has been described above, the present invention may be implemented in yet other preferred embodiments of the present invention as will be described in exemplary detail below.

With the preferred embodiments described above, the control mode of the central controller 8 preferably transitions automatically from the autopilot mode to the automatic berthing mode when the destination approach condition is satisfied. However, the transition of the control mode may be left up to the manual operation of the vessel operator instead. That is, while switching the screen display on the display device 10 from the autopilot screen to the automatic berthing control screen, the control mode of the central controller 8 may be maintained in the autopilot mode or may be made to transition from the autopilot mode to the normal mode.

Although with the preferred embodiments of the present invention described above, the route from the current position to the destination preferably is calculated by the autopilot device 71, the calculation of the planned route may be performed by the central controller 8 instead. That is, the autopilot control unit 109 may have a route planning unit for the autopilot function.

In the autopilot mode, the scale of the map may be changed gradually in accordance with the distance between the small vessel 1 and the destination. That is, a detailed map may be displayed as the destination is approached. The sizes of the current position icon and the destination icon (vessel icons) may be changed in accordance with the scale of the map.

The control mode of the central controller 8 may be displayed on the display device 10. Especially during execution of the autopilot mode or the automatic berthing mode, it is preferable to provide a display indicating the mode on the display device 10.

Although with the preferred embodiments of the present invention described above, the current position of the small vessel 1 preferably is detected by the GNSS receiver 72, another current position detection unit may be used instead. For example, an arrangement where the current position of the small vessel 1 is detected using a gyroscope and the vessel speed may be applied.

In place of providing the distance measuring unit 73a, the central controller 8 may calculate the distance from the small vessel 1 to an object. For example, a distance from the small vessel 1 to a docking object may be measured from an image of the camera 58.

The vessel maneuvering for docking, etc., preferably is achieved by operation of the vessel icon 140 displayed in the peripheral image and therefore the joystick device 9 may be omitted.

The example of the propulsion device is not restricted to an outboard motor. Examples of the propulsion device include water jet pumps, inboard/outboard motors, inboard motors, etc. Various preferred embodiments of the present invention preferably are applied when a propulsion device of any form is used. The number of propulsion devices does not have to be two and may be one or not less than three. The motor of the propulsion device is not restricted to an engine and may be an electric motor.

The present application corresponds to Japanese Patent Application No. 2013-200200 filed in the Japan Patent Office on Sep. 26, 2013 and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel display system comprising:
    a display device; an autopilot screen display unit that is configured to display, on the display device, an autopilot screen for an autopilot mode of automatically controlling a course of a vessel so as to guide the vessel to a destination;
    an automatic berthing control screen display unit that is configured to display, on the display device, an automatic berthing control screen for an automatic berthing mode of automatically controlling a propulsion device and a steering mechanism so as to make the vessel be berthed at a berthing target position;
    a destination approach condition judging unit that is configured to judge whether or not a predetermined destination approach condition, indicating that the vessel is not more than a predetermined distance from the destination, is satisfied;
    a peripheral image display unit that is configured to display, on the display device, a peripheral image that is an actual image of a periphery of the vessel;
    a berthing target position approach condition judging unit that is configured to judge whether or not a predetermined berthing target position approach condition, indicating that the vessel is not more than a predetermined distance from the berthing target position, is satisfied; and
    a screen transition control unit that is configured or programmed to automatically make the display on the display device transition from the autopilot screen to the automatic berthing control screen when the destination approach condition judging unit judges that the destination approach condition is satisfied, and to make the display on the display device transition automatically from the automatic berthing control screen to the peripheral image when the berthing target position approach condition judging unit judges that the berthing target position approach condition is satisfied.

2. The vessel display system according to claim 1, further comprising:
    a current position acquisition unit that is configured to acquire a current position of the vessel; wherein
    the autopilot screen includes a map information including the current position of the vessel acquired by the current position acquisition unit.

3. The vessel display system according to claim 2, wherein the automatic berthing control screen includes the current position of the vessel acquired by the current position acquisition unit and includes a map information that is more detailed than the map information included in the autopilot screen.

4. The vessel display system according to claim 1, wherein the destination approach condition includes a condition that a distance between the current position of the vessel and the destination is not more than a predetermined distance.

5. The vessel display system according to claim 1, wherein the destination approach condition includes a condition that a current position of the vessel is within a predetermined area that includes the destination.

6. The vessel display system according to claim 1, further comprising:
    a touch panel provided on a display surface of the display device; wherein
    the autopilot screen includes a destination icon indicating the destination; and
    the vessel display system further comprises a destination change accepting unit that is configured to accept an operation of changing the destination by moving the destination icon on the display surface of the display device by operating the touch panel when the autopilot screen is displayed on the display device.

7. The vessel display system according to claim 6, wherein the automatic berthing control screen includes a berthing target position icon indicating the berthing target position; and the vessel display system further comprises a berthing target position change accepting unit that is configured to accept an operation of changing the berthing target position by moving the berthing target position icon on the display surface of the display device by operating the touch panel when the automatic berthing control screen is displayed on the display device.

8. The vessel display system according to claim 7, wherein the berthing target position change accepting unit is configured to accept an operation of changing a berthing attitude of the vessel at the berthing target position by changing a direction of the berthing target position icon on the display surface of the display device by operating the touch panel when the automatic berthing control screen is displayed on the display device.

9. A vessel comprising:
    a hull;
    a propulsion device mounted on the hull;
    a steering mechanism mounted on the hull;
    a vessel display system including:
        a display device;
        an autopilot screen display unit that is configured to display, on the display device, an autopilot screen for an autopilot mode of automatically controlling a course of a vessel so as to guide the vessel to a destination;
        an automatic berthing control screen display unit that is configured to display, on the display device, an automatic berthing control screen for an automatic berthing mode of automatically controlling a propulsion device and a steering mechanism so as to make the vessel be berthed at a berthing target position;
        a destination approach condition judging unit that is configured to judge whether or not a predetermined destination approach condition, indicating that the vessel is not more than a predetermined distance from the destination, is satisfied;

a peripheral image display unit that is configured to display, on the display device, a peripheral image that is an actual image of a periphery of the vessel;

a berthing target position approach condition judging unit that is configured to judge whether or not a predetermined berthing target position approach condition, indicating that the vessel is not more than a predetermined distance from the berthing target position, is satisfied; and a screen transition control unit that is configured or programmed to automatically make the display on the display device transition from the autopilot screen to the automatic berthing control screen when the destination approach condition judging unit judges that the destination approach condition is satisfied, and to make the display on the display device transition automatically from the automatic berthing control screen to the peripheral image when the berthing target position approach condition judging unit judges that the berthing target position approach condition is satisfied; and a vessel running controlling apparatus, which includes the autopilot mode and the automatic berthing mode in control modes to control the propulsion device and the steering mechanism, configured such that the control mode automatically transitions from the autopilot mode to the automatic berthing mode when the destination approach condition is satisfied.

* * * * *